(12) United States Patent
Bouve et al.

(10) Patent No.: US 6,415,291 B2
(45) Date of Patent: Jul. 2, 2002

(54) SYSTEM AND METHODS FOR REMOTELY ACCESSING A SELECTED GROUP OF ITEMS OF INTEREST FROM A DATABASE

(75) Inventors: W. Lincoln Bouve, Milton, MA (US); William T. Semple, Arlington, VA (US); Steven W. Oxman, Riva, MD (US)

(73) Assignee: Civix-DDI, LLC, Boulder, CO (US)

( * ) Notice: Subject to any disclaimer, the term of this patent is extended or adjusted under 35 U.S.C. 154(b) by 0 days.

(21) Appl. No.: 09/816,829

(22) Filed: Mar. 23, 2001

Related U.S. Application Data

(63) Continuation of application No. 08/920,044, filed on Aug. 28, 1997, which is a continuation of application No. 08/371,425, filed on Jan. 11, 1995, now Pat. No. 5,682,525.

(51) Int. Cl.[7] .............................................. G06F 17/30
(52) U.S. Cl. ......................... 707/10; 707/3; 707/104.1; 701/201; 701/208; 709/218
(58) Field of Search .......................... 707/104, 10, 1–6, 707/104.1, 10.3; 701/201–208, 209–213; 709/217–219

(56) References Cited

U.S. PATENT DOCUMENTS

| | | |
|---|---|---|
| 1,737,520 A | 11/1929 | Richardson, Jr. |
| 2,455,209 A | 11/1948 | Anderson |
| 2,455,210 A | 11/1948 | Anderson |
| 3,612,837 A | 10/1971 | Brandau |
| 3,614,328 A | 10/1971 | McNaughton et al. |
| 3,724,079 A | 4/1973 | Jasperson et al. |
| 3,949,191 A | 4/1976 | Crowther et al. |
| 3,968,573 A | 7/1976 | Poliniere |
| 4,012,133 A | 3/1977 | Burton |
| 4,086,632 A | 4/1978 | Lions |

(List continued on next page.)

FOREIGN PATENT DOCUMENTS

| | | |
|---|---|---|
| DE | 4033829 C2 | 4/1991 |
| EP | 0051228 A2 | 5/1982 |
| EP | 0066397 A1 | 8/1982 |
| EP | 0119674 A1 | 9/1984 |
| EP | 0141508 A1 | 5/1985 |

(List continued on next page.)

OTHER PUBLICATIONS

"Desktop Mapping The MapInfo Way;" *MapInfo Press,* Troy, NY, 1990.
"MapInfo User's Guide Version 1.1;" MapInfo Corporation, Troy, NY, 1990.
"MapInfo Microcomputer Mapping Software Version 2.0" Mapping Information Systems Corporation, Troy, NY, 1988.

(List continued on next page.)

*Primary Examiner*—Hosain T. Alam
(74) *Attorney, Agent, or Firm*—Lathrop & Gage L.C.

(57) ABSTRACT

A user can access a common database from a remote communications port, at any qualified location, to generate a map or other positional information which locates selected items of interest, e.g., businesses, stores, architectural sites, and the like. The database contains information representing the items of interest, including, for each of the items of interest, positional coordinates, a geographic vicinity, and a selected category. The positional coordinates discretely locate the vicinity, while the vicinity specifies the exact locations of the items of interest in the selected category. For example, a user in New York can select the display of sporting shops in the area surrounding Chicago O'Hara International Airport selectively. A user can also access a port and display locations of items of interest within the same vicinity as the user and relative to the user's position. The database can be modified from qualified remote locations to change, or add to, the information therein. An advertisement can be tagged to the display or print out as an association with the selected items of interest.

23 Claims, 15 Drawing Sheets

U.S. PATENT DOCUMENTS

| | | |
|---|---|---|
| 4,220,994 A | 9/1980 | Hendrickson |
| 4,253,150 A | 2/1981 | Scovill |
| 4,301,506 A | 11/1981 | Turco |
| 4,311,876 A | 1/1982 | Endo et al. |
| 4,312,041 A | 1/1982 | DeJonge |
| 4,312,577 A | 1/1982 | Fitzgerald |
| 4,315,747 A | 2/1982 | McBryde |
| 4,395,740 A | 7/1983 | Yuen et al. |
| 4,400,727 A | 8/1983 | Aron |
| 4,400,780 A | 8/1983 | Nagao et al. |
| 4,413,314 A | 11/1983 | Slater |
| 4,413,322 A | 11/1983 | Foster et al. |
| 4,419,079 A | 12/1983 | Georges et al. |
| 4,428,057 A | 1/1984 | Setliff et al. |
| 4,429,385 A | 1/1984 | Cichelli et al. |
| 4,466,125 A | 8/1984 | Kanayama |
| 4,470,119 A | 9/1984 | Hasebe et al. |
| 4,481,584 A | 11/1984 | Holland |
| 4,484,192 A | 11/1984 | Seitz et al. |
| 4,502,123 A | 2/1985 | Minami et al. |
| 4,504,913 A | 3/1985 | Miura et al. |
| 4,511,973 A | 4/1985 | Miura et al. |
| 4,513,377 A | 4/1985 | Hasebe et al. |
| 4,514,810 A | 4/1985 | Ito et al. |
| 4,521,857 A | 6/1985 | Reynolds, III |
| 4,525,717 A | 6/1985 | Wildermuth et al. |
| 4,527,155 A | 7/1985 | Yamaki et al. |
| 4,528,552 A | 7/1985 | Moriyama et al. |
| 4,532,514 A | 7/1985 | Hatano et al. |
| 4,538,229 A | 8/1985 | Baltzer et al. |
| 4,543,572 A | 9/1985 | Tanaka et al. |
| 4,546,439 A | 10/1985 | Esparza |
| 4,546,873 A | 10/1985 | Debenham et al. |
| 4,550,317 A | 10/1985 | Moriyama et al. |
| 4,558,300 A | 12/1985 | Goldman |
| 4,570,227 A | 2/1986 | Tachi et al. |
| 4,571,684 A | 2/1986 | Takanabe et al. |
| 4,577,062 A | 3/1986 | Hilleary et al. |
| 4,608,656 A | 8/1986 | Tanaka et al. |
| 4,630,209 A | 12/1986 | Saito |
| 4,635,136 A | 1/1987 | Ciampa et al. |
| 4,635,202 A | 1/1987 | Tsujii et al. |
| 4,642,775 A | 2/1987 | Cline et al. |
| 4,645,873 A | 2/1987 | Chomet |
| 4,646,089 A | 2/1987 | Takanabe et al. |
| 4,673,197 A | 6/1987 | Shtipelman et al. |
| 4,675,676 A | 6/1987 | Takanabe et al. |
| 4,677,450 A | 6/1987 | Ito et al. |
| 4,679,147 A | 7/1987 | Tsujii et al. |
| 4,682,160 A | 7/1987 | Beckwith, Jr. et al. |
| 4,685,068 A | 8/1987 | Greco, II et al. |
| 4,689,747 A | 8/1987 | Kurose et al. |
| 4,698,625 A | 10/1987 | McCaskill |
| 4,706,198 A | 11/1987 | Thurman |
| 4,716,404 A | 12/1987 | Tabata et al. |
| 4,733,356 A | 3/1988 | Haeussermann et al. |
| 4,737,916 A | 4/1988 | Ogawaw et al. |
| 4,737,927 A | 4/1988 | Hanabusa et al. |
| 4,744,033 A | 5/1988 | Ogawa et al. |
| 4,744,083 A | 5/1988 | O'Neill et al. |
| 4,757,455 A | 7/1988 | Tsunoda et al. |
| 4,758,959 A | 7/1988 | Thoone et al. |
| 4,760,531 A | 7/1988 | Yasui et al. |
| 4,761,742 A | 8/1988 | Hanabusa et al. |
| 4,763,270 A | 8/1988 | Itoh et al. |
| 4,766,555 A | 8/1988 | Bennett |
| 4,774,670 A | 9/1988 | Palmieri |
| 4,774,672 A | 9/1988 | Tsunoda et al. |
| 4,779,138 A | 10/1988 | Nomura et al. |
| 4,780,717 A | 10/1988 | Takanabe et al. |
| 4,782,447 A | 11/1988 | Ueno et al. |
| 4,788,643 A | 11/1988 | Trippe et al. |
| 4,791,572 A | 12/1988 | Green, III et al. |
| 4,796,189 A | 1/1989 | Nakayama et al. |
| 4,796,190 A | 1/1989 | Cummings |
| 4,805,119 A | 2/1989 | Maeda et al. |
| 4,812,843 A | 3/1989 | Champion, III et al. |
| 4,812,980 A | 3/1989 | Yamada et al. |
| 4,817,043 A | 3/1989 | Brown |
| 4,827,420 A | 5/1989 | Musa |
| 4,839,656 A | 6/1989 | O'Neill et al. |
| 4,843,569 A | 6/1989 | Sawada et al. |
| 4,845,631 A | 7/1989 | Bottorf |
| 4,862,374 A | 8/1989 | Ziemann |
| 4,862,390 A | 8/1989 | Weiner |
| 4,868,771 A | 9/1989 | Quick et al. |
| 4,870,576 A | 9/1989 | Tornetta |
| 4,873,513 A | 10/1989 | Soults et al. |
| 4,890,104 A | 12/1989 | Takanabe et al. |
| 4,890,249 A | 12/1989 | Yen |
| 4,893,127 A | 1/1990 | Clark et al. |
| 4,896,154 A | 1/1990 | Factor et al. |
| 4,897,792 A | 1/1990 | Hosoi |
| 4,907,274 A | 3/1990 | Nomura et al. |
| 4,914,605 A | 4/1990 | Loughmiller, Jr. et al. |
| 4,926,336 A | 5/1990 | Yamada |
| 4,937,570 A | 6/1990 | Matsukawa et al. |
| 4,937,572 A | 6/1990 | Yamada et al. |
| 4,937,752 A | 6/1990 | Nanba et al. |
| 4,943,974 A | 7/1990 | Motamedi |
| 4,951,211 A | 8/1990 | De Villeroche |
| 4,951,212 A | 8/1990 | Kurihara et al. |
| 4,954,958 A | 9/1990 | Savage et al. |
| 4,954,959 A | 9/1990 | Moroto et al. |
| 4,963,864 A | 10/1990 | Iihoshi et al. |
| 4,965,586 A | 10/1990 | O'Neill et al. |
| 4,972,319 A | 11/1990 | Delorme |
| 4,974,170 A | 11/1990 | Bouve et al. |
| 4,982,332 A | 1/1991 | Saito et al. |
| 4,989,151 A | 1/1991 | Nuimura |
| 4,992,947 A | 2/1991 | Nimura et al. |
| 4,996,645 A | 2/1991 | Schneyderberg Van Der Zon |
| 4,999,780 A | 3/1991 | Mitchell |
| 5,005,147 A | 4/1991 | Krishen et al. |
| 5,021,961 A | 6/1991 | Ross et al. |
| 5,030,117 A | 7/1991 | Delorme |
| 5,031,104 A | 7/1991 | Ikeda et al. |
| 5,032,989 A | 7/1991 | Tornetta |
| 5,036,523 A | 7/1991 | Briskman |
| 5,043,902 A | 8/1991 | Yokoyama et al. |
| 5,059,965 A | 10/1991 | Geiser |
| 5,068,838 A | 11/1991 | Klausner et al. |
| 5,084,822 A | 1/1992 | Hayami |
| 5,089,826 A | 2/1992 | Yano et al. |
| 5,103,400 A | 4/1992 | Yamada et al. |
| 5,109,399 A | 4/1992 | Thompson |
| 5,115,399 A | 5/1992 | Nimura et al. |
| 5,117,363 A | 5/1992 | Akiyama et al. |
| 5,121,325 A | 6/1992 | DeJonge |
| 5,124,924 A | 6/1992 | Fukushima et al. |
| 5,133,081 A | 7/1992 | Mayo |
| 5,136,334 A | 8/1992 | Rae et al. |
| 5,142,480 A | 8/1992 | Morrow |
| 5,146,219 A | 9/1992 | Zechnall |
| 5,148,522 A | 9/1992 | Okazaki |
| 5,155,806 A | 10/1992 | Hoeber et al. |
| 5,161,242 A | 11/1992 | Boulay |
| 5,164,904 A | 11/1992 | Sumner |
| 5,172,321 A | 12/1992 | Ghaem et al. |
| 5,173,691 A | 12/1992 | Sumnar |
| 5,177,685 A | 1/1993 | Davis et al. |

| | | | | | | |
|---|---|---|---|---|---|---|
| 5,179,385 A | 1/1993 | O'Loughlin et al. | | 5,727,201 A | 3/1998 | Burke |
| 5,179,652 A | 1/1993 | Rozmanith et al. | | 5,729,731 A | 3/1998 | Yajima et al. |
| 5,197,009 A | 3/1993 | Hoffman, Jr. et al. | | 5,751,956 A | 5/1998 | Kirsch |
| 5,212,643 A | 5/1993 | Yoshida | | 5,754,850 A | 5/1998 | Janssen |
| 5,214,757 A | 5/1993 | Mauney et al. | | 5,784,059 A | 7/1998 | Morimoto et al. |
| 5,220,507 A | 6/1993 | Kirson | | 5,845,278 A | 12/1998 | Kirsch et al. |
| 5,229,947 A | 7/1993 | Ross et al. | | 5,848,373 A | 12/1998 | DeLorme et al. |
| 5,237,323 A | 8/1993 | Saito et al. | | 5,855,020 A | 12/1998 | Kirsch |
| 5,237,499 A | 8/1993 | Garback | | 5,870,546 A | 2/1999 | Kirsch |
| 5,239,480 A | 8/1993 | Huegel | | 5,920,854 A | 7/1999 | Kirsch et al. |
| 5,243,528 A | 9/1993 | Lefebvre | | 5,963,915 A | 10/1999 | Kirsch |
| 5,262,775 A | 11/1993 | Tamai et al. | | 6,282,489 B1 | 8/2001 | Bellesfield et al. |
| 5,265,024 A | 11/1993 | Crabill et al. | | | | |
| 5,275,568 A | 1/1994 | Pfuetze | | | | |

FOREIGN PATENT DOCUMENTS

| | | | |
|---|---|---|---|
| EP | 0330787 B1 | 9/1989 | |
| EP | 0349430 A2 | 1/1990 | |
| EP | 0379198 A3 | 7/1990 | |
| EP | 0508787 A2 * | 10/1992 | ............ 17/30 |
| EP | 0452613 A2 | 2/1993 | |
| EP | 0539146 A3 | 4/1993 | |
| EP | 0539146 A2 | 4/1993 | |
| GB | 2048604 A | 12/1980 | |
| GB | 2215319 A | 9/1989 | |
| JP | 62151884 | 7/1987 | |
| JP | 6312096 | 1/1988 | |
| JP | 1119898 | 5/1989 | |
| JP | 1173820 | 7/1989 | |
| JP | 1173823 | 7/1989 | |
| JP | 23899 | 1/1990 | |
| JP | 236653 | 2/1990 | |
| JP | 2187898 | 7/1990 | |
| JP | 376000 | 3/1991 | |
| JP | 3140816 | 6/1991 | |
| JP | 3141499 | 6/1991 | |
| JP | 3150699 | 6/1991 | |
| JP | 3231047 | 10/1991 | |
| JP | 3282580 | 12/1991 | |
| JP | 4251284 | 9/1992 | |
| JP | 519684 | 1/1993 | |
| JP | 5165401 | 7/1993 | |
| JP | 5303335 | 11/1993 | |
| JP | 5313580 | 11/1993 | |
| JP | 5333768 | 12/1993 | |
| JP | 5334373 | 12/1993 | |
| JP | 666578 | 3/1994 | |
| JP | 666584 | 3/1994 | |
| WO | 92/14215 | 8/1992 | |
| WO | 92/21001 | 11/1992 | |
| WO | 94/29808 | 12/1994 | |

| | | |
|---|---|---|
| 5,282,052 A | 1/1994 | Johnson et al. |
| 5,283,575 A | 2/1994 | Kao et al. |
| 5,289,195 A | 2/1994 | Inoue |
| 5,289,371 A | 2/1994 | Abel et al. |
| 5,289,572 A * | 2/1994 | Yano et al. ............ 345/326 |
| 5,291,412 A | 3/1994 | Tamai et al. |
| 5,291,413 A | 3/1994 | Tamai et al. |
| 5,293,163 A | 3/1994 | Kakihara et al. |
| 5,293,484 A | 3/1994 | Dabbs, III et al. |
| 5,299,132 A | 3/1994 | Wortham |
| 5,307,292 A | 4/1994 | Brown et al. |
| 5,317,628 A | 5/1994 | Misholi et al. |
| 5,321,520 A | 6/1994 | Inga et al. |
| 5,329,108 A | 7/1994 | Lamoure |
| 5,329,464 A | 7/1994 | Sumic et al. |
| 5,334,974 A | 8/1994 | Simms et al. |
| 5,362,239 A | 11/1994 | Pfuetze |
| 5,365,449 A | 11/1994 | Kashiwazaki |
| 5,369,429 A | 11/1994 | Erickson |
| 5,371,678 A | 12/1994 | Nomura |
| 5,375,074 A | 12/1994 | Greenberg et al. |
| 5,379,421 A | 1/1995 | Palazzi, III et al. |
| 5,381,338 A | 1/1995 | Wysocki et al. |
| 5,396,254 A | 3/1995 | Toshiyuki |
| 5,398,186 A | 3/1995 | Nakhla |
| 5,402,117 A | 3/1995 | Zijderhand |
| 5,422,809 A | 6/1995 | Griffin et al. |
| 5,424,951 A | 6/1995 | Nobe et al. |
| 5,432,841 A | 7/1995 | Rimer |
| 5,442,557 A | 8/1995 | Kaneko |
| 5,452,240 A | 9/1995 | Roca et al. |
| 5,457,738 A | 10/1995 | Sylvan |
| 5,461,708 A | 10/1995 | Kahn |
| 5,471,205 A | 11/1995 | Izawa |
| 5,471,392 A | 11/1995 | Yamashita |
| 5,524,202 A | 6/1996 | Yokohama |
| 5,526,265 A | 6/1996 | Nakhla |
| 5,528,518 A | 6/1996 | Bradshaw et al. |
| 5,532,838 A | 7/1996 | Barbari |
| 5,537,324 A | 7/1996 | Nimura et al. |
| 5,543,788 A | 8/1996 | Mikuni |
| 5,543,789 A | 8/1996 | Behr et al. |
| 5,550,746 A | 8/1996 | Jacobs |
| 5,559,707 A | 9/1996 | DeLorme et al. |
| 5,570,283 A | 10/1996 | Shoolery et al. |
| 5,579,535 A | 11/1996 | Orlen et al. |
| 5,581,678 A | 12/1996 | Kahn |
| 5,584,025 A | 12/1996 | Keithley et al. |
| 5,608,635 A | 3/1997 | Tamai |
| 5,617,319 A | 4/1997 | Arakawa et al. |
| 5,625,771 A | 4/1997 | Sakaguchi et al. |
| 5,635,953 A | 6/1997 | Hayami et al. |
| 5,648,768 A | 7/1997 | Bouve |
| 5,652,717 A | 7/1997 | Miller et al. |
| 5,659,732 A | 8/1997 | Kirsch |
| 5,682,525 A | 10/1997 | Bouve et al. |
| 5,699,244 A | 12/1997 | Clark, Jr. et al. |

OTHER PUBLICATIONS

"MapInfo Command Reference Version 4.0;" Mapping Information Systems Corporation, Troy, NY, 1989.

"MapInfo 4.50 Release Notes," Mapping Information Systems Corporation, Troy, NY, 1990.

"MapInfo Desktop Mapping Software Addendum;" *Mapping Information Systems Corporation*, Troy, NY, 1988.

"MapInfo for Dos, User's Guide Version 5.0;" MapInfo Corporation, Troy, NY.

"MapInfo for Dos, Command Reference Version 5.0;" Mapping Information Systems Corporation, Troy, NY, 1991.

Computer Printout; Crabb, Don; "MapInfo 2.0; the latest release of MapInfo goes to the head of the class . . . ;" *MacUser,* vol. 9, No. 8, p. 65, 8/93.

"Geographical Information Systems vol. 1: Principles;" *Longman Scientific & Technical,* Essex, England, pp. 18–43, 1991.

"Geographical Information Systems vol. 2; Applications;" *Longman Scientific & Technical*, Essex, England, pp. 272–273, 1991.

"ARC/Info/ vol. 2 Command References;" Environmental Systems Research Institute, Users Guide 1989.

"ARC/Info Primer 4.0;" Environmental Systems Research Institute, Users Guide 7/87.

"Nextbase launches AutoRoute Express version 3.0;" (source and date unknown).

"AutoRoute Plus User Guide;" NextBase Limited, Staines, Middlesex, England, Jul. 1989.

"AutoRoute Plus Reference Manual;" NextBase Limited, Staines, Middlesex, England, 1989.

"NextBase developing European route system;" *Transport Week*, p. 20, Aug. 25, 1990.

"Mapbase;" NextBase Limited, Middlesex, England, 1993.

"News Briefs;" *Videotex World*, Jun. 1985, p. 62.

"Viewpoint;" *Videotex World*, Jun. 1986, p. 35.

CADIS Brochure; "Increasing Building Productivity;" Alphatel Videotex Directories Limited.

CADIS Brochure; "Serving the Needs of Advertisesrs and Shoppers with Effective In–Mall Advertising;" Alphatel Videotex Directories Limited 1985.

CADIS Brochure; "Directing shoppers to your store;" Alphatel Videotex Directories Limited 1985.

Brochure; "CADIS Increasing shopping centre productivity;" Alphatel Videotex Directories Ltd.

Publication; *Videotex World*, 9/84.

Publication; *Videotex World*, vol. 2 No. 2, 12/85.

Publication; *Videotex World*, vol. 2 No. 1, 9/85.

*Videotex World*, vol. 3, No. 2, pp. 1 & 37, Winter 1986.

Raggett, Michael; "Public Access Videotex: A Sensible Way Forward;" *Videotex World*, vol. 2, No. 2, pp. 18–22, 12/85.

Dahl, Brad; "CADIS An Example of Specialization in Public Access Videotex Systems;" *Videotex World*, vol. 2, No. 3, pp. 14–18, 3/86.

Advertisement, "A New Approach to Public Access;" *Videotex World*, vol. 2, No. 3, p. 57, Spring 1986.

"A Network of Teleguide Systems to Link North American Systems;"*Videotex News*, (undated).

"New Growth for Grassroots;" *Videotex News*, (undated).

"Sweet Reason Versus Faith;" *Videotex News*, (undated).

"Home Videotex—Now You Can Bank on It;" *Videotex News*, (undated).

Brochure; "How to make a big mall small;" Alphatel Videotex Directories Ltd. 1985.

Brochure; "CADIS Information So your customers don't get lost in the crowd;" Alphatel Videotex Directories Ltd., (undated).

Brochure; "CADIS Serving the Needs of Advertisers and Shoppers with Effective In–Maill Advertising;" Alphatel Videotex Directories Ltd., 1985.

Brochure; "CADIS Increasing Building Productivity;" Alphatel Videotex Directories Ltd., (undated).

Dahl, Brad; "Computerized Directories;" *Signs of the Times*, vol. 207, No. 8, Aug. 1985, pp. 70–71, 139–143.

Dahl, Brad; "The Electronic Marketplace;" *Signs of the Times*, Dec. 1985, pp. 71–73, 152–153.

Advertisement, Alphatel Videotex Directories Limited, *Signs of the Times*, p. 14, date unknown, p. 14.

Advertisement, Alphatel Videotex Directories Limited, *Signs of the Times*, p. 18, date unknown, p. 18.

"Directory Listings;" *Signs of the Times*, (date unknown).

*Signs of the Times Buyer's Guide*, vol. 205, No. 12, p. 72, 1984.

Advertisement for CADIS; *Signs of the Times;* 1986 Buyer's Guide.

Advertisement; *Signs of the Times,* p. 18, Mid–Nov. 1986.

Dahl, Brad; "Computerized Directories," *Signs of the Times,* Vo. 207, No. 8, pp. 70–72, 139–144, 8/85.

"Products;" *Signs of the Times,* 10/87.

Hurley, Paul; "Learning to Market Electronically;" *enRoute,* Feb. 1986, p. 40–41, 65–66, 68–71, 73–74.

Advertisement, "How to make a big mall small, CADIS," (source and date unknown).

"edmonton telephones' 1985 annual report;" p. 9–10.

"Sweet's Catalog File;" McGraw Hill Information Systems Company, NY, NY, multiple pages, 1986.

Unknown source; "CADIS info system debuts at airport;" Aug. 1986.

"Mall's directory highly advanced;" *The Edmonton Journal,* Dec. 1986, p. C3.

"AutoRoute Nieuwsbrief;" *Zomereditie,* 1992.

"Autoroute upgrades to go places;" *What Micro?* May 1989.

"Finding your way to next base;" *PC Business World.*

Hughes, Ken; "Applications;" *PC Today,* p. 8–832, 7/90.

*What's new in Computing,* cover page only, Jul./Aug. 1991.

"UK version 4 of AutoRoute Plus;" (unable to read source and date).

"Express version of Autoroute launched;" *PC Week,* p. 4, Apr. 30, 1991.

"Autoroute—drommen for lata bilister;" *Micro Datorn (Sweden),* 10/93.

"Best–Selling Personal and Education Programs;" *PC/Computing* (date unknown).

"Bodite na cilju pred drugimi!" *Win:ini* p. 48–49, 52–53, 12/94.

"Take Your PC on the Road;" (source and date unknown).

"Autoroute Express for Windows;" *What PC?,* p. 26, 2/93.

"AutoRoute Express for Windows;" *Personal Computer World,* p. 214–216, 11/1992.

"automap road atlas guide for Windows;" AutoMap, Inc., Bellevue, WA, 1993.

Brochure; "automap road atlas version 3.0 for Windows;" AutoMap, Inc., 1993.

"automap road atlas guide for Macintosh;" AutoMap, Inc., Bellevue, WA, 1993.

Users Guide; "AutoMap Pro;" Microsoft, 1995.

Michaelides, Lee; "Lyme Firm Intent on Digitizing the National;" Manning Publications Inc., 1986.

(JP) Mitsubishi Brochures; "Voice Guide & 8ch GPS Navigation".

(JP) Brochure; "Software Information;" 1993.

(JP) Catalog; "Zenrin Navisoft Full Line–Up Catalogue;" ASCII Corporation/Zenrin Corporation 1992.

(JP) Zenrin Brochure 1993.

(JP) Zenrin Advertisement (Navisoft).

(JP) Catalog, "Carrozzeria by Pioneer".

(JP) Brochure; "Panasonic Car Entertainment System".

Dahl, Brad; "Try Videotex to Trip that Buying Impulse;" *Shopping Center World,* (no date).

Wagg, Dana; "Computer Finds Shops;" *Edmonton Examiner,* Jan. 21, 1985.

News Release; "New Electronic Service Available to City Visitors;" Edmonton Convention & Tourism Authority, Jan. 28, 1986.

"CADIS is as easy as ABC;" *The Edmonton Sunday,* Jan. 5, 1985.

CADIS Map, West Edmonton Mall.

CADIS Advertisement, *The Edmonton Sunday* Jan. 21, 1985.

"Advanced Interactive Video, Inc. Business Plan" Sep. 1987.

Byard, Katie; "Automated directory may save mall shoppers steps;" *Akron Beacon Journal,* Jul. 15, 198__.

Nash, Bob; "Mall test encourages interactive computer firm;" (source and date unknown).

"Viola!—New POP System from AIV;" *The Videodisc Monitor,* p. 3, Sep. 1995.

Vloyanetes, Peter and Magel, Mark; "Electronic retailing;" *Marketing Communications,* pp. 31–37, 79, 5/86.

Bixler, Brian; "Marketplace is literally at your fingerprints;" *Florida Today,* pp. 1E–2E, May 15, 1986.

"DeBartolo Rolls Out Viola System Malls;" *The Videodisc Monitor,* p. 5, 7/87.

Article, "What's New;" *Ohio Business,* p. 73, 7/87.

Pounds, Marcia H.; "Need mall news? Voila;" *News/Sun-Sentinel,* Palm Beach, Apr. 26, 1986.

Ocker, Lisa; "'Viola!' New Computer Assists Shoppers at Palm Beach Mall;" *The Post,* Apr. 29, 1986.

Computer Printout—Nash, Bob; "Mall Test Encourages Interactive Computer Firm;" *Business First–Columbus Inc.,* Columbus, OH, p. 16, Sep. 16, 1985.

Computer Printout; Berger, Dan; "Teleguide's coming to town; Machines offer some good, free advice;" *The San Diego Union–Tribune,* p. 11, Mar. 10, 1985.

Computer Printout; Latamore, G. Berton; "Public–Access Videotex Makes Computers Visitor Friendly;" *Chicago Tribune Company,* Sports Final Edition, p. 76, Jun. 14, 1985.

Computer Printout; "Infomart of Dallas: Mixing the old with the new;" *Data Communications,* p. 62, 10/84.

Computer Printout; Beeler, Jeffrey; "Videotex system puts LA at Olympics visitors' fingertips;" *Computerworld, Inc.,* p. 1, Aug. 6, 1984.

Computer Printout; "Chronicle–Videotex; Acquires U.S. Teleguide rights;" *Business Wire, Inc.* Jun. 9, 1986.

Computer Printout; Hurly, Paul; "Boosting Sales . . . Electronically;" *Industry Week,* p. 33, Mar. 31, 1986.

Computer Printout; Berger, Dan; "Videotex is hard to define;" *The San Diego Union–Tribune,* p. 1–10, Mar. 10, 1985.

Computer Printout; Bartimo, Jim; "Videotex Changes Direction;" InfoWorld Media Group, p. 34, May 21, 1984.

Computer Printout; "SFCVB; And Bay Area Teleguide join forces to guide tourists;" *Business Wire, Inc.,* May 9, 1984.

Computer Printout; "A Videotex Pioneer Pushes Into the U.S. Market;" *Business Week,* p. 63, Apr. 16, 1984.

Computer Printout; "Electronic Almanacs are There for the Asking;" *The New York Times,* Sec. 4; p. 9, Mar. 18, 1984.

Computer Printout; "Mitsui to Introduce Canadian 'Teleguide' Videotex Software in Japan;" Jiji Press Ticker Service, Mar. 5, 1985.

Computer Printout; "Videotex industry searches for salvation;" *ASAP,* vol. 106, p. 40, Apr. 23, 1984.

Computer Printout; Varin, Andra; "Travel shorts;" *United Press International,* Nov. 12, 1986.

Computer Printout; "Baltimore Offers Data by Computer;" *Los Angeles Times,* Part 7, p. 16, Nov. 16, 1986.

Computer Printout; Furchgott, Roy; "Angling for Ad Dollars with Tourism Technology;" *Baltimore Business Journal,* vol. 4, No. 2, Sec. 1, p. 4, Jun. 23, 1986.

Computer Printout; Ruoff, Mary; "Dutch Look to Bridge Cities' Business, Culture;" *Baltimore Business Journal,* vol. 5, No. 44, Sec. 2, p. 1B, Apr. 11, 1988.

Pollack, Andrew; "Electronic Almanacs are There for the Asking;" *The New York Times,* Mar. 18, 1984.

Copy of CD ROM inserts; "Streets USA;" *CD USA,* 1998 (windows).

Copy of CD ROM inserts; "Deluxe Streets USA Business Edition;" *CD USA,* 1999 (Windows 95, Windows NT).

Copy of CD ROM inserts; "Deluxe Streets USA Business Edition;" *CD USA,* 1999 (Windows 95 & 98 & NT).

"A Guide to Zip2 Hoembase Technology;" Zip 2 Corporation, 1999.

"Zip 2 Media Platform;" Zip 2 (no date).

"Zip 2 Homebase;" Zip 2 (no date).

"Zip 2 Business Directory;" Zip 2 (no date).

"Zip 2 Real Estate Guide;" Zip 2 (no date).

"Zip 2 Auto Guide;" Zip 2 (no date).

"AltaVista Zip 2 Community;" Zip 2 (no date).

"Zip 2 Professional Services;" Zip 2 (no date).

"98 Infoseek Annual Report;" Infoseek Corporation, Sunnyvale, CA.

Publication; "National Mall Monitor;" May/Jun. 1984, p. 220.

Teleservices Report, Nov. 1985; Arlen Communications, Inc., pp. 9–10.

Osata, Margaret; "Electronic Shopping: No Dinosaurs But Lots of Center Directories;" *Shopping Center World,* May 1984, pp. 132–140.

Hurley, Paul; "Learning to Market Electronically;" (unable to read title of magazine); Feb. 1986, pp. 40–41, 65–74.

"Technology: At Home on the sSelling Floor, Retailers are Becoming Comfortable with High–Tech In–Store Systems;" *Chain Store Age Executive,* pp. 35–36, 12/87.

"Lucky Uses High–Tech Kosks for Advantage;" *Chain Store Age Executive,* pp. 57–58, 9/87.

"Designs Expands Single–Vector Concert;" *Chain Store Age Executive,* pp. 78 & 80, 1/88.

"Some Home Centers Opt for DIY Videos;" *Chain Store Age Executive,* pp. 361–362, 9/88.

"Ads on Wheels Roll Into Supermarkets;" *Chain Store Age Executive,* p. 49, 9/88.

"DIY Promos Via Video POS;" *Chain Store Age Executive,* pp. 76, 78.

"Interactive Video: Revealing Who and How;" *Chain Store Age Executive,* p. 28, 7/88.

"Interactive POS Video Yields Instant Results;" *Chain Store Age Executive,* p. 52 & 51, 9/88.

"Product Review;" *Identity,* pp. 12 & 14, Summer 1988.

"P.O.P./Interactive;" *Electronic Display News,* pp. 9–10, Feb./Mar. 1989.

"What is Happening with Interactive Technology;" *Video Systems,* pp. 46 & 50, 8/99.

"1983 Buyer's Guide," *Sign of the Times,* p. 107–108.

Catalog of participants with booths at "ICSC 1985 Convention, Exposition and Leasing Mall, New Orleans, May 12–17".

"Trade Mall;" *SCW Convention News Daily,* pp. 67–68, May 15, 1985.

"Sample Pricing;" p. 11 (source unknown).

CADIS Advertisement; *SCW Convention News Daily*, p. 67, May 15, 1985.

"CADIS Multi Reference Manual Table of Contents;" pp. 1–13, Jan. 23, 1987.

Letter from Gary Arlen of Arlen Communications, Inc. to Don Shalley of Saskatchewan Tourism and Small Business; Oct. 3, 1986 (2 pp.).

Letter from Joyce Routson of Kalt & Associates to Brad Dahl of Brad Dahl Holdings; Feb. 13, 1985 (1 p.).

"Backgrounders;" (source and date unknown), pp. 1–2.

"CADIS info system debuts at airport;" *Edmonton Examiner*, Aug. 18, 1986.

"Mall's directory highly advanced," *The Edmonton Journal*, p. C3, Dec. 22, 1986.

"'edmonton telephones' 1985 annual report;" 'edmonton telephones', pp. 9–10.

News Release; "New Electronic Service Available to City Visitors;" Edmonton Convention & Tourism Authority, Jul. 28, 1986.

Brochure; "CADIS Directing shoppers to your store;" (undated).

Brochure; "CADIS;" KROY Sign Systems (undated).

Brochure; "NCR InteracTV–2," (source and date unknown).

Brochure; "ATN," ATNI, Provo, UT (date unknown).

Brochure; "AT&T Public Access Terminal;" (source unknown) Feb. 1986.

Brochure; "IBM Video/PAssage Author and IBM Video Passage Presentor;" International Business Machines International, Atlanta, GA 1986.

Brochure; "IBM InfoWindow System—Equipment that make information come alive;" International Business Machines International, Atlanta, GA 1986.

Brochure; "IBM InfoWindow System—One touch makes information come alive;" International Business Machines International, Atlanta, GA 1986.

Brochure; "IBM Expo Info—Helping You Touch The Future;" International Business Machines International, Atlanta, GA 1986.

Brochure; "Product Announcement—IBM 4055 InfoWindows Display Announced;" IBM Canada ltd., pp. 1–7, Jun. 16, 1986.

Brochure; "Programming Announcement—Video/Passage Multimedia Authoring and Presentation System Version 1;" IBM Canada ltd., pp. 1–10, Jun. 16, 1986.

Brochure; "Programming Announcement—IBM InfoWindow Control Program Version 1.0, Release 1.1;" IBM Canada ltd., pp. 1–10, Jun. 16, 1986.

Genesys Public Access Terminal Enclosure Brochure; "For Public Information;" Genesys Group, Ottawa, Ont., CA (Date unknown).

Brochure; "Tough Protection for Public Access Electronics;" Bratton Crews Cumming Group, Inc., (date unknown).

PIRT Brochure; New Media Technologies Ltd., Burnaby, BC, CA (date unknown).

Brochure; "Teleguide;" Infomart (date unknown).

Brochure; "Teleguide—Satisfying consumer needs;" Infomart, Toronto, Ont., CA (date unknown).

Teleguide Flyer; "facts;" Infomart, Toronto, Ont., CA (date unknown).

Chronicle Videotex, Inc. Fact Sheet, undated, San Francisco, CA.

Selected pages from *Teleguide News;* "We've Got 50,000 Customers Lined Up for You This Week" and more.

Brochure; "CompuDirect;" Computer Sign Systems Limited, Markham, Ont. CA (undated).

Brochure; "CompuDirect2;" Computer Sign Systems Limited, Markham, Ont. CA (undated).

Brochure; "Electronic Directory Systems;" Clair Woertendyke Associates, Inc.

Brochure; "Make IT'S A Part of Your Electronic Merchandising Strategy;" Interactive Training Systems, Inc. (unknown).

Brochure; "Directouch 1000;" Metro Vision of North America, Syracuse, NY, (undated).

Brochure; "Touchdown Typical Applications;" Digital Technologies, Inc., 1992.

Brochure; "Select/One;" SWS Information Systems, Santa Monica, CA (undated).

Mailing from Inter–ad, Inc., Rochester, NY, to retailers, dated Sep. 23, 1986, with attachments.

User's Manual; "Acura TL Navigation SystemI;" Honda Motor Do., Ltd., 1998.

Catalgog; "1999 Magellan Products;" Magellan Corporation, San Dimas, CA.

Operator's Guide, "PathMaster;" Magellan Corporation, Rochester Hills, MI.

User Manual; "Map 410;" Magellan, San Dimas, CA (undated).

Flyer; "Map 410 Satellite Navigator" (undated).

Brochure; "Magellan PathMaster—Turn–by–turn route guidance & driver information system;" Magellan Driver Information Systems, Rochester Hills, MI (undated).

Brochure; "Magellan 750 NAV Vehicle Navigation System;" Magellan Driver Information Systems, Rochester Hills, MI 1999.

Computer printout, "Magellan Pathmaster;" magellangps.com Aug. 5, 1999.

Introductory Guide; "Street Atlas USA;" DeLorme, Yarmouth, ME, 1997.

User's Guide; "Earthmate GPS Receiver;" DeLorme, Yarmouth, ME, 1998.

Brochure; "Street Atlas USA 5.0;" DeLorme, Yarmouth, ME (undated).

Brochure; "SkyMap Traveler, the Complete GPS and Map'System for All Your Travel Needs;" Etak, Inc., Menlo Park, CA 1998.

Brochure; "SkyMap Pro—The GPS and Map'System that Everyone is Talking About;" Etak, Inc., Menlo Park, CA 1998.

Brochure; "Capitalize on the Robust Performance of GeoEngine;" Etak, Inc., (undated).

Seminar Material; "Course 231 Vehicular Navigation & Location Systems Technology;" Navigation Technology Seminars, Alexandra, VA, 12/87.

Seminar Material; "The $3^{4rd}$ Annual Conference on Vehicle Navigation & Information Systems, Conference Record of Papers;" Institute of Electrical and Electronics Engineers, Inc.; Aug. 1992.

Schoreder, J.L. and Green, Jeff; "The Emergence of Smart Traveler Kioks and the User Interface Requirements for their Successful Deployment;" IVHS America 1994 Annual Meeting; Paper 94111, Apr. 1994.

Vizard, Frank; "Orienting in the electronic age;" *San Francisco Examiner—Inside Track*, pp. 34–36, Nov. 23, 1986.

Marshall, Loren; "Tracking the Wild Ambulance Fleet;" *jems*, pp. 58–61, 9/87.

"Color Remote Map Reader Packaged for USAF Tests;" *Aviation Week & Space Technology,* p. 142–143, Aug. 22, 1983.

Anderson, Robert H. and Shapiro, Norman Z.; "Design Considerations for Computer–Based Interactive Map Display Systems;" *Computer Graphics Hardware,* pp. 10–34 (date unknown).

Totani, Shinzo, Kato Takaski and Muramoto, Kazuo; "Automotive Navigation System;" The Second Annual International Pacific Conference on Automotive Engineering, Paper 830910, 11/83.

Honey, Stanley K., Marvin S. White, Jr., and Zavoli, Walter B.; "Extending Low Cost Land Navigation Into Systems Information Distribution and Control;" IEEE Position Location & Navigation Symposium, 11/86.

Sweeney, Lawrence E.; "An Overview of IVHS Sensor Requirements", Proceedings—Sensors Expo West San Jose, California Mar. 2–4, 1993; Helmers Publishing, Inc. et al.

Flyer; "Covia Partnership;" GeoSystems, Lancaster, PA.

Cooke, Donald F.; "Map Storage on CD–ROM;" *Byte,* pp. 130–136, 7/87.

Paper; Hamlen, Mark D.; "Fleet Management with Automatic Vehicle Location;" 36$^{th}$ Vehicular Technology Conference, pp. 374–380, 5/86.

"TransCad Transportation GIS Software;" Caliper Corporation, (date unknown).

Forrest, David; "Seeing data in new ways;" *Computerworld,* pp. 5, 86, Jun. 29, 1992.

Juhl, Ginger M.; "GIS–based Information Network Helps Law Enforcement Efforts to Curtail Drug Traffic;" Geo Info Systems, Jun. 20, 1989.

"Owner's Manual and Reference Guide StreetPilot GPS Color Map;" Garmin Corporation, 1/99.

"Quick Start Guide StreetPilot GPS Color Map;" Garmin Corporation, 1998.

"Owner's Manual and Reference Guide StreetPilot GPS:" Garmin Corporation, 1/98.

"Quick Start Guide StreetPilot GPS;" Garmin Corporation, 1998.

Brochure; "StreetPilot GPS Car Navigation that goes from here to here." Garmin International 1998.

"Map'n'Go Plan the Perfect Vacation;" DeLorme 1999.

"Phone Search USA Version 4.5;" DeLorme 1999.

"Street Atlas USA Version 6.0;" DeLorme 1998.

User's Guide; "Earthmate GPS Receiver;" DeLorme 1998.

Brochure to Mapping Enthusiasts re Street Atlas USA' 6.0; DeLorme, (undated).

Brochure; "AAA Map'n'Go;" DeLorme (undated).

Brochure; "Solus Pro and Earthmate GPS Receiver;" DeLorme, (undated).

Brochure to 3Com Palm Computing Organizer Owners; DeLorme, (undated).

Computer Printout; "Solus Pro Overview;" DeLorme (undated).

Computer Printout; Michaelides, Lee; "Lyme Firm Intent on Digitizing the Nation;" *Vermont Business,* Sec. 1, p. 75, 5/86.

"Midas Command Reference;" *Mapping Infomration Systems Corporation*; Version 1.21, 5/87.

"Midas Tutorial;" Mapping Information Systems Corporation, Version 1.21, 5/87.

Hrut, Christopher B.; "Navigation Technologies Executive Summary;" *Mobile World,* Conference Proceedings 1993.

Computer Printout; Warner, Edware; "Smart maps; new route to profits: digital–map systems can save siness up to $50 billion annually;" Infotechnology Publishing Corporation, High Technology Business, vol. 8, No. 12, p. 20, 12/88.

Computer Printout; McCarron, John; "Supermaps Computers Put Big Cities on Road to High Efficiency;" *Chicago Tribune,* Section—Tomorrow, p. 1, Aug. 3, 1986.

"Computer Navigation Coming to Law Enforcement;" *Law and Order,* vol. 33, No. 2, pp. 24–26, 2/85.

Brochure; "The Worlds' First Automotive Navigation System The Etak Navigator;" (source and date unknown).

Computer Printout; Fairlie, Rick; "Software Integrates city data, maps; Personal Travel Technologiese develops pathfinding system for travelers; Personal Travel Guide; Automation Report;" *Travel Weekly,* vol. 51, No. 94, p. 53, Nov. 23, 1992.

Computer Printout; Angus, Jeff; "Map Software; CityGuide takes the guesswork out of business travel," *InfoWorld,* Section: Review; p. 81, Mar. 1, 1993.

Computer Printout; Schwaback, Bob; "Computerized maps go beyond paper versions;" *Star Tribune,* Minneapolis, MN, Section: Marketplace, p. 2D, Sep. 23, 1993.

Computer Printout; Gooding, Clair; "Charting a new course—Claire Gooding looks at the benefits . . . ;" *Financial Times,* London, p. 20, Oct. 28, 1993.

Computer Printout; "Strategic Mapping introduces next generation of desktop mapping software;" *Business Wire,* Nov. 1, 1993.

News Release; "R R Donnelley Geosystems Introduces Geolocate Plus;" Geosystems, Mar. 10, 1992.

Benning, Herman J.G.M., "Digital Maps on Compact Disc;" SAE, Technical Paper Series, Paper No. 860125, 1986.

Shneiderman, Ben; "Designing the User Interface . . . Second Edition;" Addison Wesley Publishing Company, 1992.

Lax, Leo and Olsen, Mark; "NAPLPS Standard Graphics and the Microcomputer;" *Byte Publications, Inc.,* 7/83.

Braegas, Peter; "Function, Equipment, and Field Testing of a Route Guidance and Information System for Drivers (ALI);" *IEEE Transactions on Vehicular Tech.,* vol. VT29, No. 1, May 1980.

Dupree, Robert L.: "Amoco Graphics System Framework for a Mappable Corporate Data Base;" *Management's Use of Maps: Commercial and Political Applications* Harvard University, pp. 3, 13–18, 1979.

Fishbine, Glenn M.; "Future Directions In Public Service Computer Cartography: The Challenge of the Pinball Mentality;" *Urban, Regional, and State Government Applications of Computer Mapping,* vol. 11, pp. 61–67, 1980.

Gregg, Randall E.; "Application of Thematic Maps in Management Information Systems . . . ;" *Management's Use of Maps,* vol. 7, pp. 33–40, 1980.

Van Demark, Peter H.; "Development Surveillance Using GBF/DIME Technology;" *Urban, Regional, and Environmental Information . . . ,* pp. 308–314, 8/81.

Kevany, Michael J.; "The Evolution of Automated Mapping . . . Past Dozen Years;" *Conf. Theme: What'sthe Difference?,* vol. IV, 1986 Annual Conf . . . Urban and Regionall Information Sys. Assn, Denver, CO, pp. 139–147.

Crowswell, P.L.; "Developments in Data Transfer Between . . . Computer Databases;" *Conf. Theme: What'sthe Difference?,* vol. II, 1986 Annual Conf . . . Urban and Regionall Information Sys. Assn, Denver, CO, pp. 47–61.

Folchi, William and Badillo, Ann; "A New Perspective in GIS: Databases and Emerging Markets;" *GIS World, Inc.* pp. 66–79, 69–80, Aug./Sep. 1990.

"Ancient Pompeii Culture Revealed by GIS;" *GIS World, Inc.,* pp. 28–31, 1990.

Landis, John. D.; "GIS Capabilities, Uses, and Organizational Issues;" *Profiting From A Geographic Information System,* Ch. 2, pp. 23, 30–31, 1993.

Castle, Gilbert H.; "Real Estate;" *Profiting From A Geographic InformationSystem,* Ch. 5, pp. 85, 90, 1993.

Juhl, Ginger M.; "Coping with Rapid Development: County "Reinvents" Government with GIS Assistance;" *GIS World, Inc.,* Fort Collins, Co., pp. 31–34, 1/94.

Tetzeli, Rick; "Mapping for Dollars;" *Fortune,* pp. 91–92, Oct. 18, 1993.

"0Exemplary Systems and Critical Performance Factors Accessibility Evaluation;" (1 in. Thick compilation; source and date unknown).

Morris, G.; Sanders, T.; Gilman, A.; Adelson, S.; and Smith, S.; "Kiosks: A Technological Overview;" Los Alamos National Laboratory, Jan. 10, 1995.

Greenfield; "The Development of a GIS–Based Transit Advanced Traveler Information System;" 1995 URISA Proceedings, pp. 695–709.

"Auburn prof's 'computer' helps tourists avoid getting lost;" *The Atlanta Journal and Constitution;* p. 16–B Aug. 28, 1983.

Brochure; "Touch & Go;" Touch Information, Inc., Chattanooga, TN, (undated).

Brochure; "Grail Greater Resort Area Information Link;" Grail, Waitsfield, VT, (undated).

"Infoseek.go[1]" programming (undated; doc. numbered IS000002).

Computer Printout; Reinhold, Robert; "Revolution Changes the World of Maps;" *The New York Times,* Sec. C, p. 2.

Users Guide; "Automap Streets for Windows;" Automap, Inc.

* cited by examiner

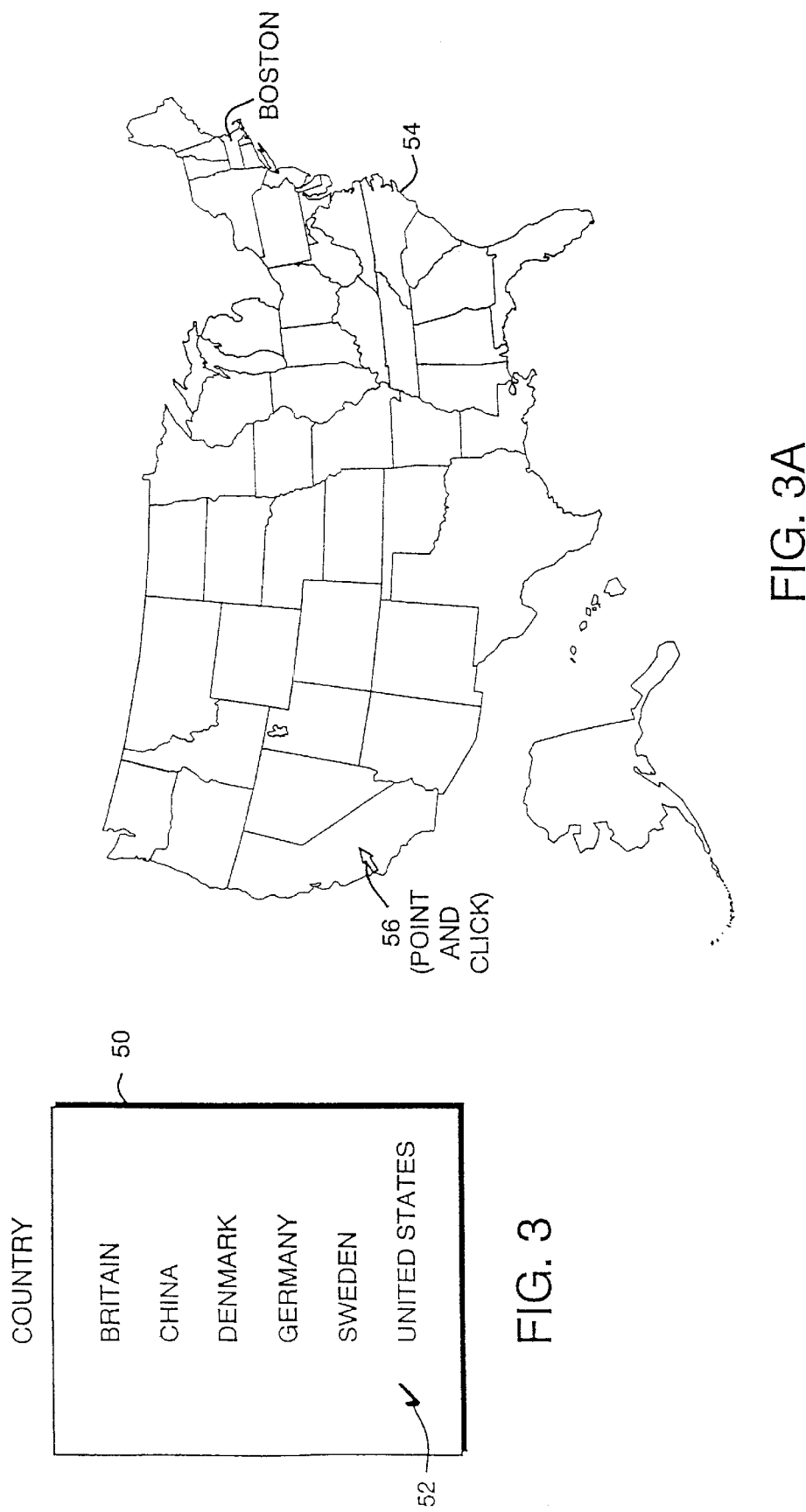

SYSTEM AND METHODS FOR REMOTELY ACCESSING A SELECTED GROUP OF ITEMS OF INTEREST FROM A DATABASE

RELATED APPLICATION

This is a continuing application of commonly owned and copending U.S. patent application Ser. No. 08/920,044, filed Aug. 28, 1997, which is a continuation of U.S. patent application Ser. No. 08/371,425, filed Jan. 11, 1995 and which is now U.S. Pat. No. 5,682,525, issued Oct. 28, 1997.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Electronic directories for identifying selected subscribers within a city are known in the prior art. For example, U.S. Pat. No. 4,974,170 describes one system which includes a fixed kiosk with an internal memory for storing locations such as businesses and historical sites within a predetermined distance from the kiosk. An input panel on the kiosk provides access to the data within the memory, and a map is generated by the system thereby locating the selected information from the kiosk.

However, such a system is inflexible. The map generated by the system is predefined; and thus the user cannot access or select information about businesses and historical sites outside of the predefined map. A user of the system must also know the exact location of the kiosk in order to use the system. Tourists and business travelers to the city are unlikely to know of the kiosk; and thus the kiosk system is of little use to such users. Further, a user must be physically present at the kiosk in order to access the information about the businesses and/or sites in the surrounding area.

In addition, the information stored within the kiosk's memory must be manually updated. This requires a series of cumbersome steps—including the physical acts of loading and downloading to the memory at the kiosk—to update the system in the event that information about a selected business changes, e.g., the business closes.

It is, accordingly, an object of the invention to provide systems and methods which reduce or remove the aforementioned difficulties.

It is yet another object of the invention to provide a system for remotely accessing selective items of interest from a database; and for displaying a geographic vicinity of the items of interest to the user selectively and at the remote location.

Still another object of the invention is to provide a system for remotely providing information identifying locations of selected items of interest at a selected destination location.

These and other objects will be apparent in the specification which follows.

SUMMARY OF THE INVENTION

As used herein, "items of interest" means services, products, geographic sites, architectural sites, stores, restaurants, public services, and other items which a user of the invention may wish to locate. "Port," "remote access port," "terminal," or "remote access terminal" are used interchangeably to denote a terminal, e.g., a personal computer with modem, from which a user of the invention can access the database storing the information about the items of interest. "Remote database" or "database" are used herein to denote a database, e.g., a client server, which stores information for access by a user of the invention from a port. "Communication link" is used to denote means, including for example a telephone line, for communicating between the database and the port. "Geographic vicinity," and "map" are used to denote a geographic region which includes and surrounds selected items of interest.

In one aspect, the invention provides a system for remotely determining the position of a selected category of items of interest in a selected geographic vicinity from a database. A database stores information about a plurality of items of interest, including, for each of the items of interest, positional coordinates, a geographic vicinity, and at least one associated category. A communications link facilitates communications between a user of the system and the database. The system also provides for transmitting a portion of the information in the database to a user via the link upon receipt of a request signal representative of a selected category and geographic vicinity. Preferably, that transmitted portion of the information includes identification of a position for the items of interest within the selected category and geographic vicinity.

The system further provides a port for remotely accessing the portion of information via the link. Specifically, the port generates the request signal in response to inputs by a user of the system; that signal being representative of the selected category and geographic vicinity. A user interface at the port accepts the inputs and communicates the position of each of the items of interest in the selected category and geographic vicinity to the user.

In accord with other aspects of the invention, the communications link can include several technologies, including a telephone link, satellite link, radio-frequency link, infrared link, internet link, facsimile link, fiber-optic link, coaxial cable link and television link. The database is, typically, a personal computer, mainframe, work-station, mini-computer, or digital data processor. To communicate the information to a user, the user interface can include a television, telephone, facsimile, audible speaker, and/or personal computer display. To accept user inputs at the port, the user interface can further include a television interface, telephone interface, facsimile interface, and/or a personal computer interface.

Preferably, the geographic vicinity includes certain spatial detail of the items of interest. For example, the geographic vicinity can include a map of the items of interest in the selected category, as well as street and landmark information displayed relative to the user's position at the remote port. As such, the set of positional coordinates generally identifies either (i) a location of a user of the system, or (ii) a destination location within the geographic vicinity.

In certain aspects of the invention, the information within the database further includes additional detail about at least one of the items of interest. Such a feature is advantageous in that, once the port displays the geographic vicinity with the items of interest, a user can thereafter select further additional detail about one or more of the items of interest. In this manner, for example, an item of interest such as a restaurant can display a picture of the interior of the restaurant to the user. The additional detail can include other multimedia information, such as video, prerecorded music, and digital pictures.

In still another aspect, the invention also communicates at least one advertisement associated with at least one of the items of interest to the user. As such, certain advertisers that are connected with the selected category of items of interest can promote a name or business.

In one aspect of the invention, the information within the database is arranged hierarchically. In this aspect, there are a plurality of discrete geographic vicinities (each set of positional coordinates corresponding to one discrete location within the geographic vicinity). The system thus provides for hierarchically selecting any of the discrete vicinities from the port in a hierarchical manner.

In still another aspect of the invention, database apparatus is provided for storing information about a plurality of items of interest. As above, that information includes, for each of the items of interest, positional coordinates, a geographic vicinity, and at least one associated category. A communications link provides for communicating between a user of the database apparatus and a remote port. The database apparatus further provides for transmitting a portion of the information to a user via the link upon receipt of a request signal representative of a geographic vicinity and a selected category of the items of interest. That transmitted portion of the information includes an identification of a position for the items of interest within the selected category and geographic vicinity.

The invention also provides, in another aspect, a remote access port for remotely accessing a selected category of items of interest in a selected geographic vicinity from a database such as described above. The port includes means for generating a request signal representative of a selected category and a selected geographic vicinity of the items of interest in response to inputs by a user of the port. A user interface accepts the inputs and indicates the position of each of the items of interest within the selected category and geographic vicinity.

In another aspect, the information includes additional detail for at least one of the items of interest, and the port further includes means for (i) generating a signal representative of a selection of at least one of the items of interest, and (ii) communicating the additional detail to the user.

The invention also provides a method for remotely determining the position of a selected category of items of interest in a selected geographic vicinity from a database, comprising the steps of: (i) storing information about a plurality of items of interest in the database, the information including, for each of the items of interest, positional coordinates, a geographic vicinity, and at least one associated category; (ii) accessing the database from a remote location and over a communication link; (iii) communicating, from the remote location, information representative of a selected category and a selected geographic vicinity to the database; and (iv) transmitting a portion of the information from the database and to the user over the link, the information including, at least, identification of a position for the items of interest within the selected category and geographic vicinity.

The invention is next described further in connection with preferred embodiments, and it will be apparent that various additions, subtractions, and modifications can be made by those skilled in the art without departing from the scope of the invention.

BRIEF DESCRIPTION OF THE ILLUSTRATED EMBODIMENTS

A more complete understanding of the invention may be obtained by reference to the drawings, in which:

FIG. 1 schematically illustrates a system constructed according to the invention;

FIG. 3 shows a user interface display of various worldwide countries providing selectable locations according to the invention and which can be displayed to a user of the system of FIG. 1;

FIG. 3A shows a user interface display of a map of the United-States providing selectable locations according to the invention and which can be displayed to a user of the system of FIG. 1;

Figure 1:
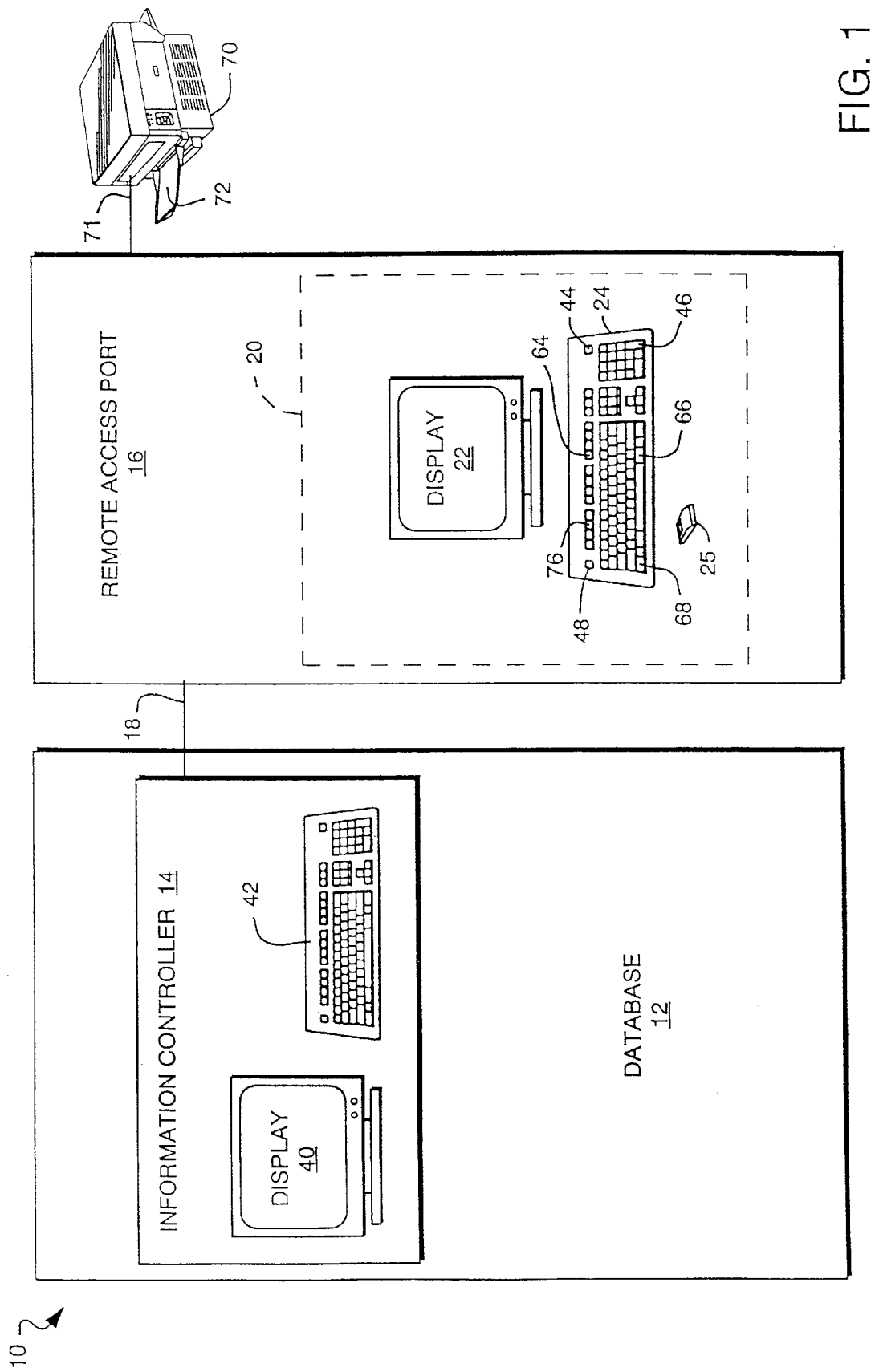
Figure 9:
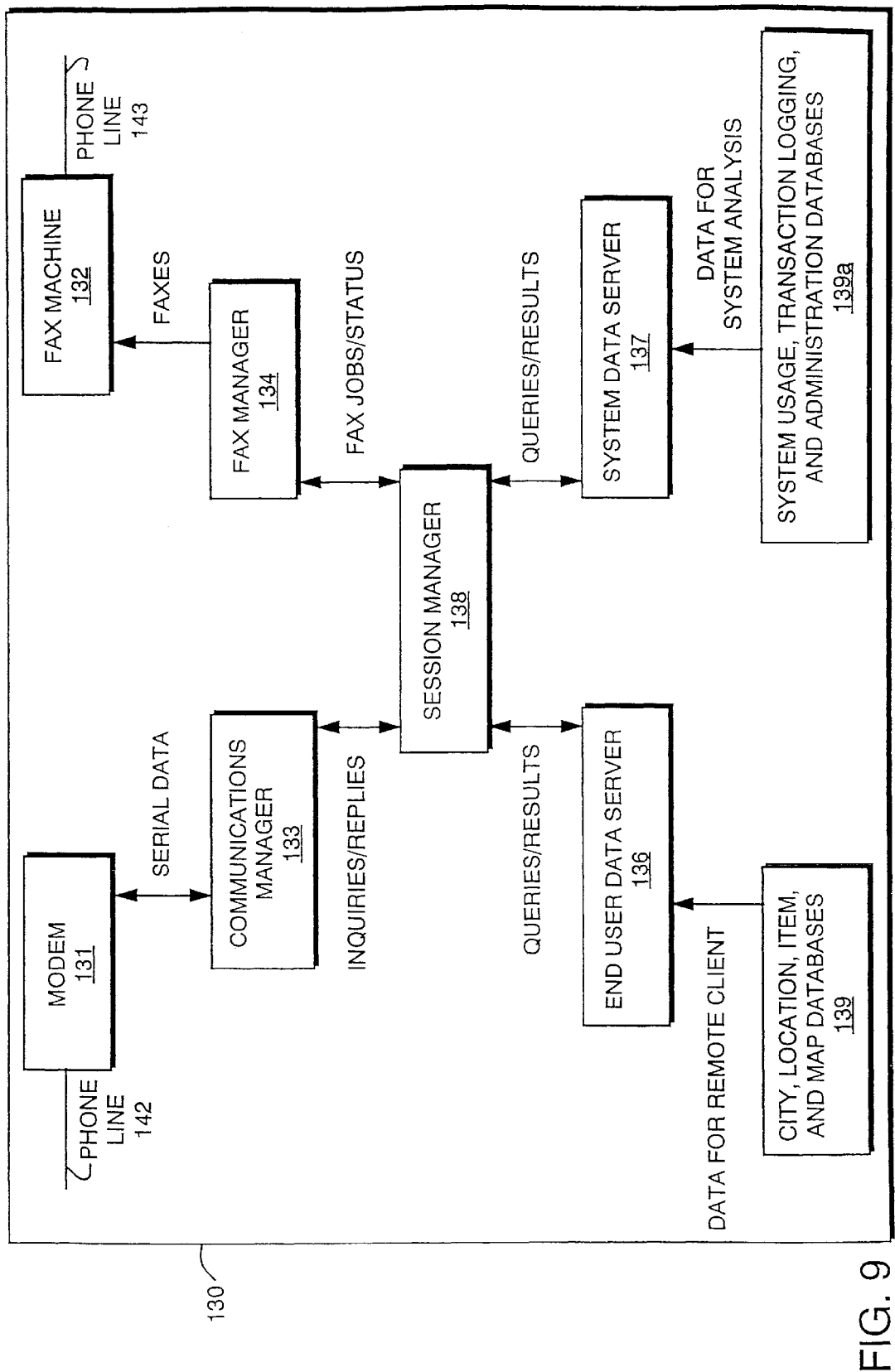
Figure 10:
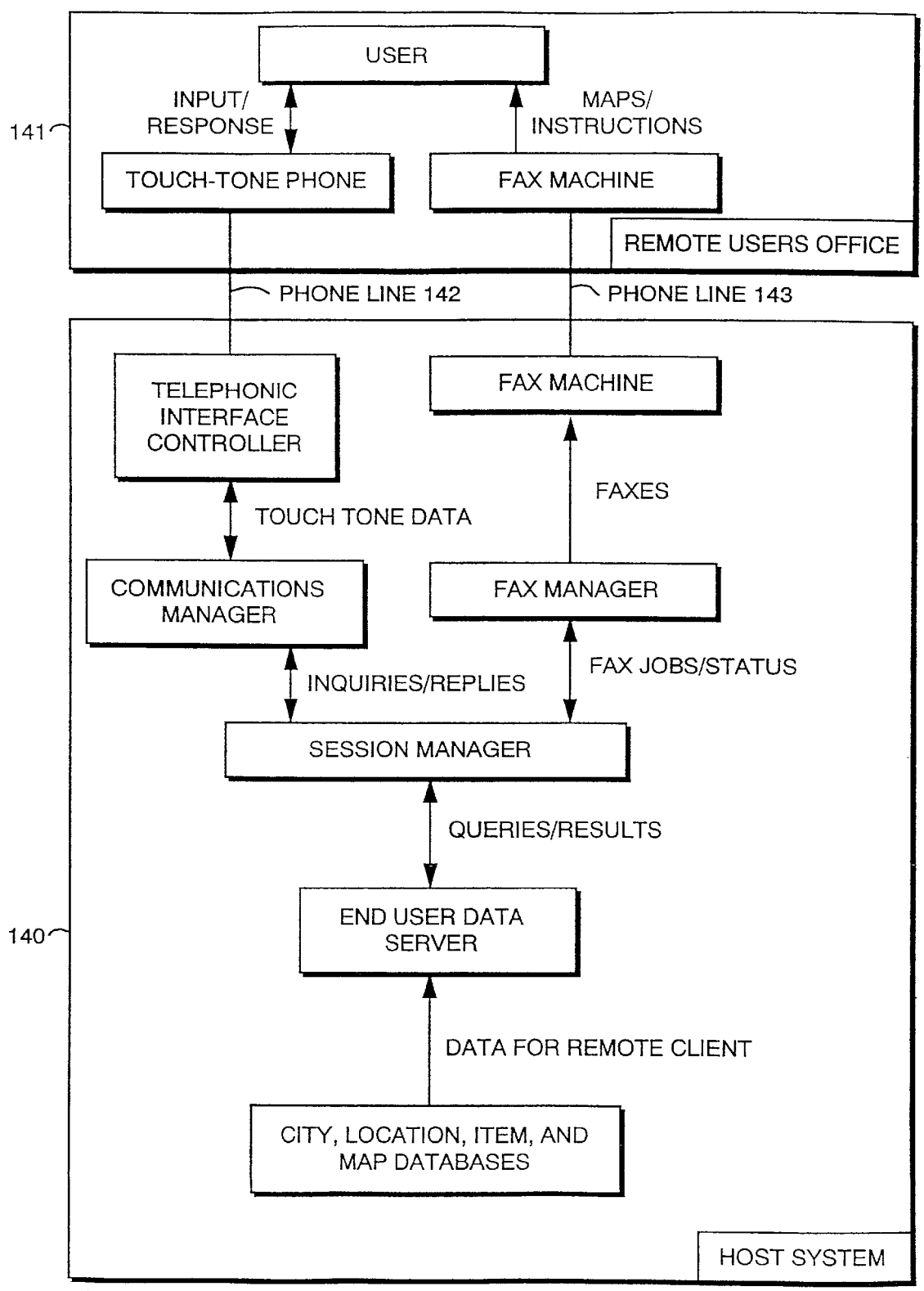
Figure 11:
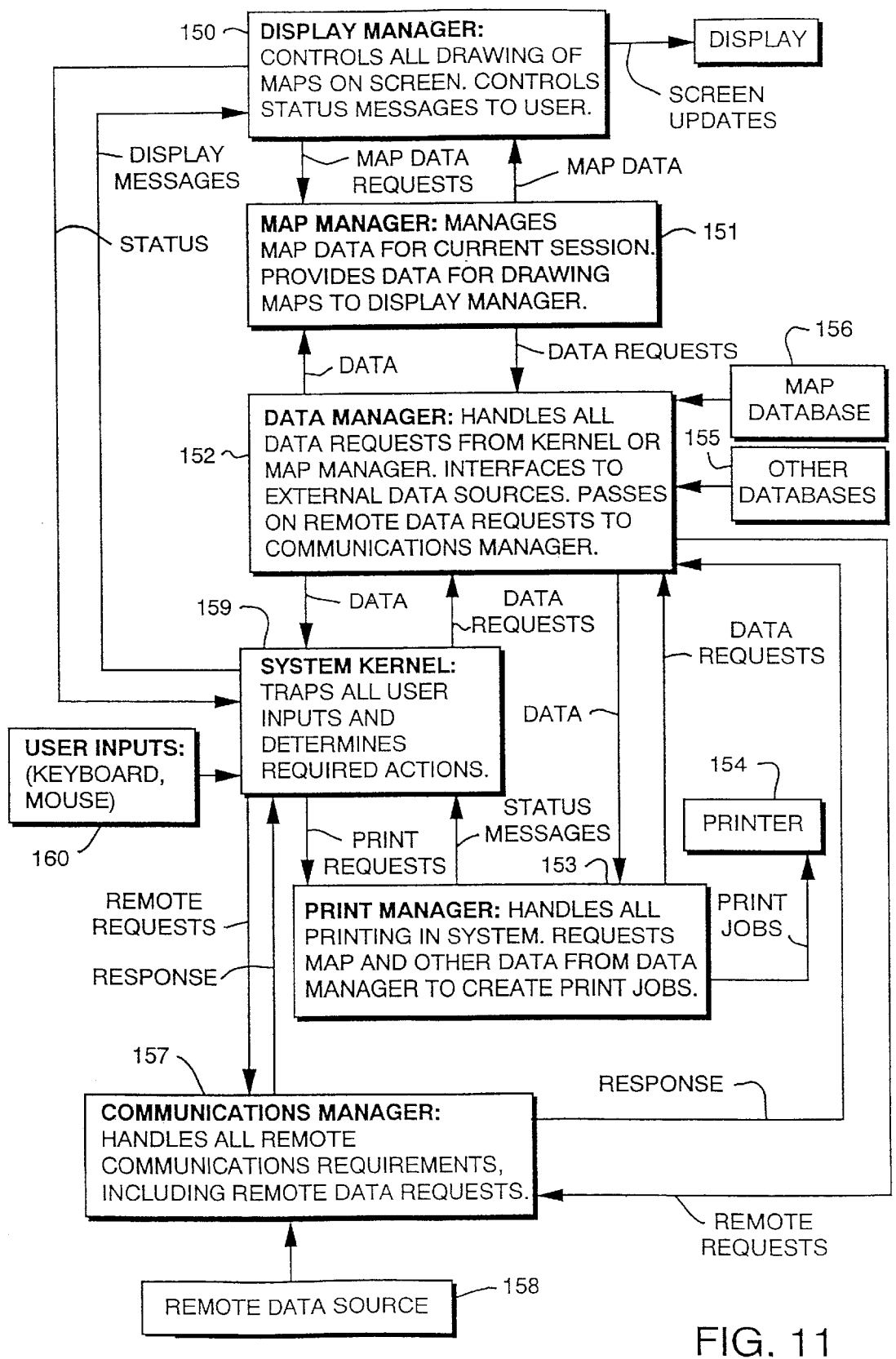
Figure 12:
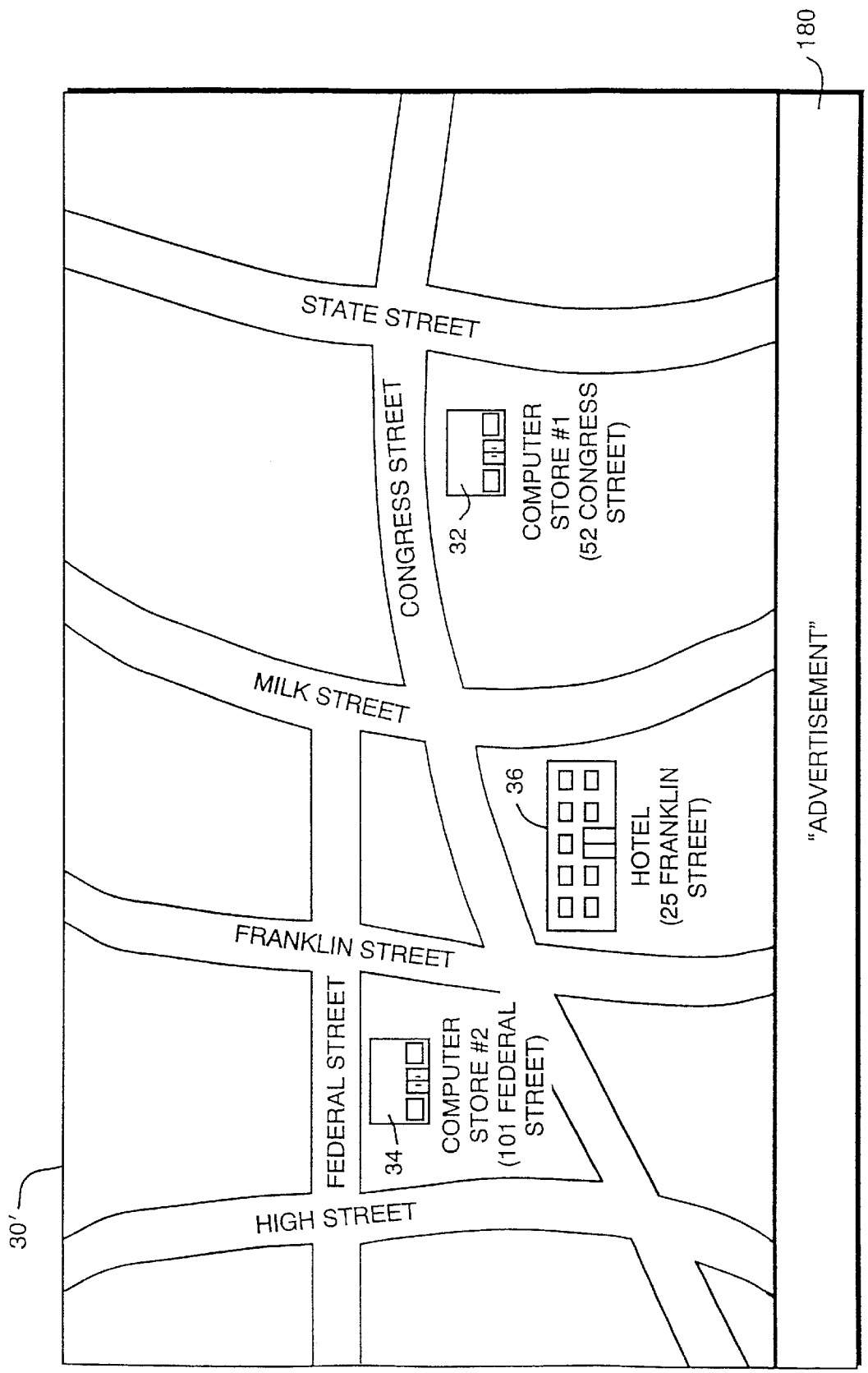

FIG. 9 schematically illustrates system architecture, constructed according to the invention, which forms a database suitable for use as the database of FIG. 1, and which services both phone and fax information and internal administrative data;

FIG. 10 shows one system architecture according to the invention, and which includes a host database and a remote port;

FIG. 11 illustrates process flow and system architecture for interfacing between user inputs and the database, in accord with the invention; and FIG. 12 shows one representative display or print-out, according to the invention, which includes an advertising field associated with the items of interest.

DETAILED DESCRIPTION

FIG. 1 illustrates a system 10 constructed according to the invention. A database 12 stores information about the items of interest, including information about locating the items of interest. The database 12 includes an information controller 14 which communicates with a remote access port 16 via a communications link 18 and which controls the access and flow of information into and out of the database 12. The information within the database 12 is accessible by the remote access port 16 upon request by a user of the port 16.

Accordingly, the port 16 preferably includes a user interface section 20 which provides a graphical display 22, keyboard 24, and mouse tracker 25 (for pointing and clicking on selected display items within the display 22).

Figure 2:
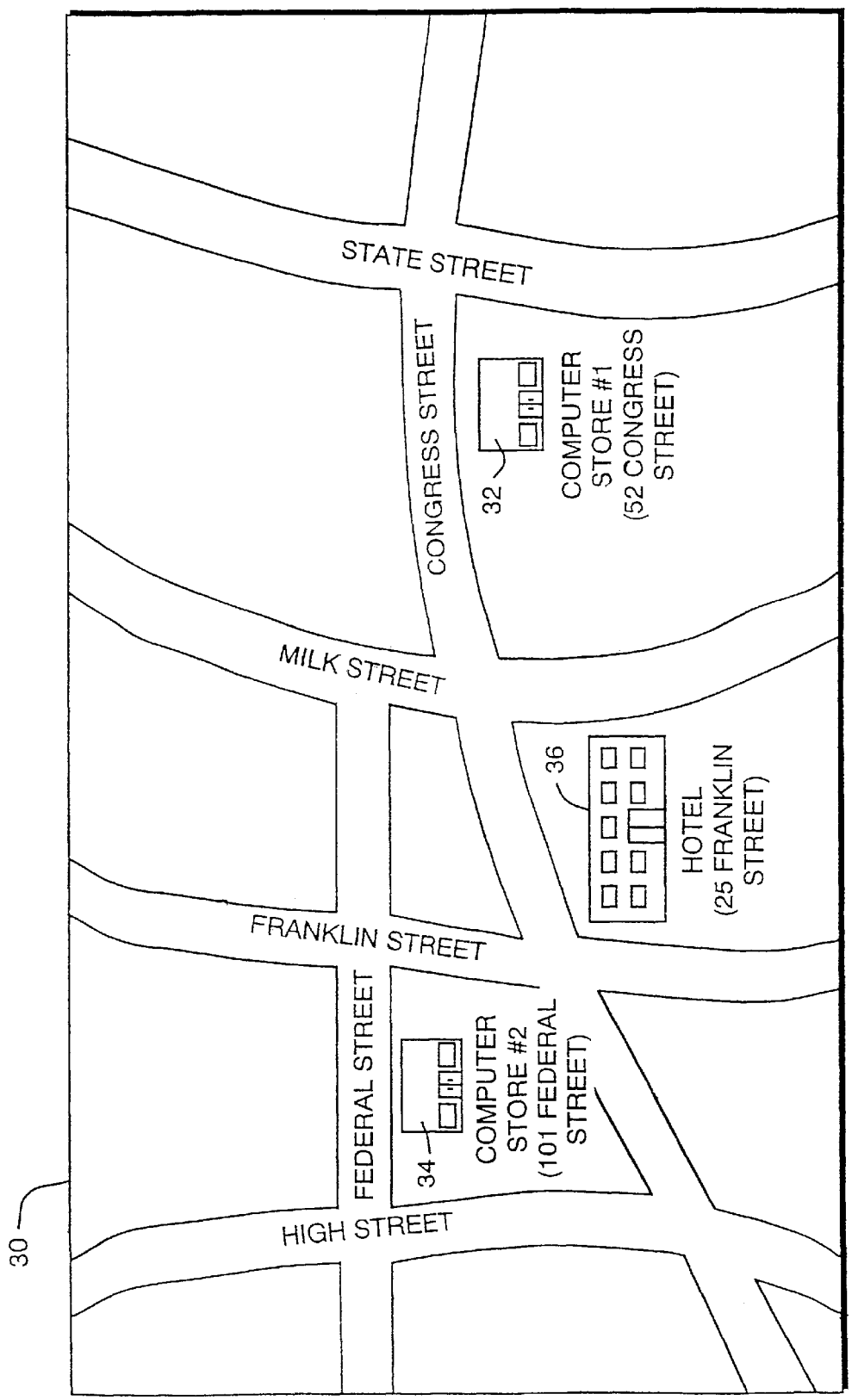
FIG. 2 shows a typical graphical illustration locating items of interest and which can be displayed to a user of the system of FIG. 1.

Specifically, the information within the database 12 includes, for each of the items of interest, positional coordinates, a geographic vicinity, and at least one associated category. Preferably, this information includes a graphical representation so that a user can easily interpret the information. FIG. 2 shows one exemplary display 30 of information locating computer products in downtown Boston, Mass. Accordingly, the associated category in this example is "computer products," and, in the illustrated display 30, the geographic vicinity includes the selected items of interest, including (i) the two computer stores 32, 34 at, respectively, 52 Congress Street and 101 Federal Street; and (ii) that area which is displayed within the display 30 and which surrounds the items of interest, such as that area displayed between the streets of High Street and State Street.

The positional coordinates, as part of the selected information, operate to locate the geographic vicinity. Briefly, the positional coordinates locate one location within the geographic vicinity—such as the center of the vicinity—so that items of interest can be determined relative to the positional coordinates and within the geographic vicinity. In addition, the geographic vicinity is preferably a rectangle of information, with North situated upwards.

In one preferred aspect of the invention, the display 30 is centered relative to the location of the user (as such, the positional coordinates of the information are set to the user's present position). For example, if the hotel 36 at 25 Franklin Street has a port 16 therein, a user of the invention can (i) access that particular port and hence the information within the database 12, and (ii) display the items of interest relative to the user's current location, i.e., at the hotel 36. Accordingly, in this embodiment, the display 30 is generated with the hotel 36 at the center of the display—corresponding to the positional coordinates of 25 Franklin Street—and the selected items of interest in the associated category are displayed on streets relative to the hotel 36. In this fashion, a user can easily walk or drive to the items of interest after leaving the hotel 36. Such a feature also gives the "appearance" to the user that the hotel 36 is at the center of activity, a desirable marketing feature for the invention.

With further reference to FIG. 1, the controller 14 preferably includes a display 40 and a keyboard 42 so that an operator of the system 10 can add and modify the information within the database 12. This is especially useful because information about the items of interest changes regularly; and thus the information within the database 12 is preferably updated on a regular basis so that users of the system 12 receive accurate information. For example, in a typical commercial location such as illustrated in Figure 2, new retail stores open and existing retail stores close throughout the year. The invention thus provides for updating information within the database 12, such as through the control of a system operator typing commands at the keyboard 42.

Alternatively, the system 10 provides for remotely updating the database 12 with new information via any of the ports 16 or via a remote computer with a modem, described in more detail in connection with FIG. 6A. Specifically, the controller 14 provides access security which allows only authorized access for modification of the database 12. As such, a system administrator at a remote port 16 can download information to the database, or modify existing information within the database, as needed and without physically operating the keyboard 42.

The communications link 18 of the invention can take many forms. It is generally impractical to "hard-wire" each remote access port 16 to the database 12; so the form of the communications link 18 generally includes existing communication networks, such as one or more of the following: telephone lines, fiber-optic cabling, satellite communications, cellular communications, radio and microwave-frequency communicators, infra-red communicators, the facsimile mechanism, airphones, modems, the internet, co-axial cabling, television including interactive TV communications, and the like. These communication networks and subsystems are readily known to those skilled in the art without further reference hereto. Nevertheless, FIGS. 6A–6B illustrate representative communication links, according to the invention, which comprise one or more of these communication networks.

Figure 7B:
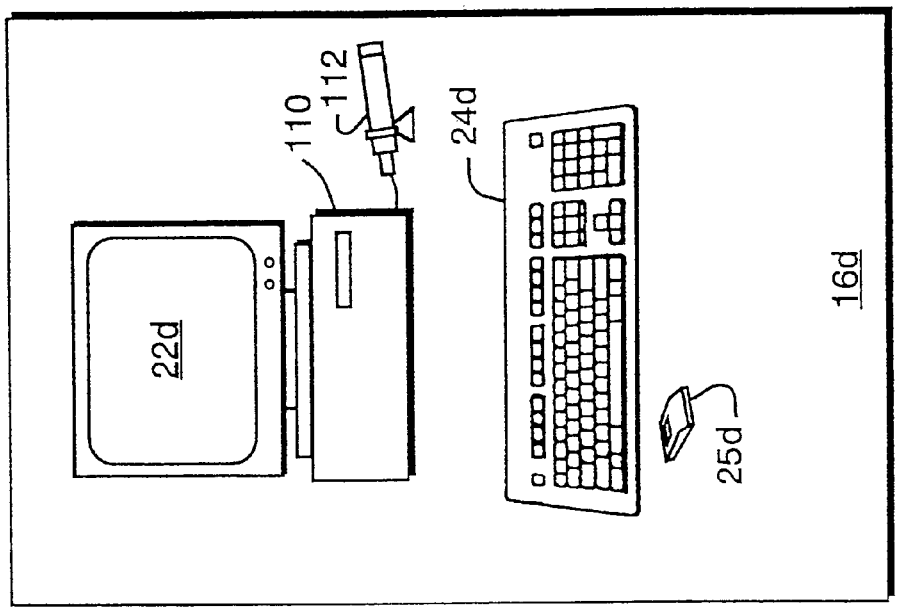
FIGS. 7A and 7B illustrate various remote port display technologies, according to the invention, which are suitable for use within the remote port of the system of FIG. 1.
Figure 7A:
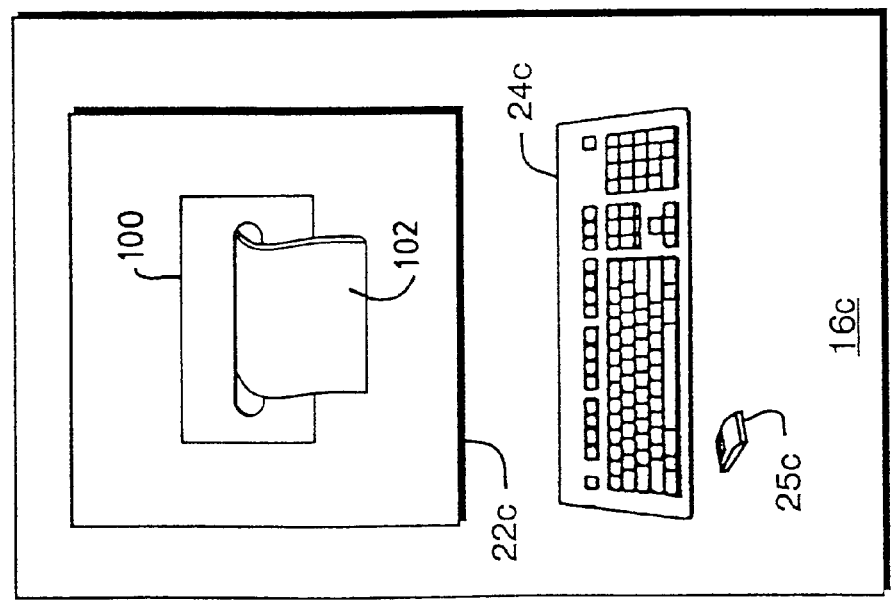

The displays 22 and 40 of FIG. 1 include those displays known to those skilled in the art, including the cathode-ray-tube (CRT), Liquid Crystal Display (LCD), and an array of Light Emitting Diodes (LEDs). However, the display 22 can also take the form of a paper or voice communication port, such as a facsimile output (hard-copy), printer, a voice communication synthesizer with automated digitized voice responses, a voice-driven menu systems, or as other devices capable of rendering digitized or analogue output signals. FIGS. 7A and 7B below illustrate some of these alternative forms of the display 22.

The remote access port 16 is generally provided at locations of public access in a city. Accordingly, the invention supports a nearly unlimited number of ports 16 that are connected for communication with the database 12, each of the ports being connected to the database 12 such as shown in FIG. 1 and such as described in more detail below. For example, the port 16 of the invention is appropriately placed in one or more hotels, restaurants, and public facilities (such as a train station) in the city. In Boston, Massachusetts, therefore, the port 16 of the invention would ideally be accessible at several different locations, particularly at busy locations, such as at (i) North and South Stations, (ii) Logan Airport and at each of the several airport terminals, (iii) within several (or many, if not all) of Boston's hotels and restaurants, and (iv) at car rental locations.

The invention provides, generally, two modes of operation for a user accessing the port 16. In the first mode of operation, the user within the desired geographic vicinity accesses the database through the port 16 for information about the items of interest located near-by. This mode was described in connection with FIG. 2. That is, when the user is located within the geographic vicinity, e.g., at the hotel 36, a user can locate any of the items of interest relative to the hotel 36 and display items of interest in the associated category, e.g., computer products, through a street map connecting streets to and from the hotel 36. In this manner, as described above, a user can easily locate the items of interest from his or her present location, which determines the positional coordinates of the geographic vicinity.

In one embodiment of the invention, a user accesses this first mode of operation by selecting the "LOCAL INFO" key 44 on the keyboard 42, FIG. 1. Upon selection, the system 10 provides information, such as a graphical display shown in FIG. 2, at the port 16 to locate items of interest within the geographic vicinity of the user and relative to the user's current location. The scope of the geographic vicinity is generally within walking distance.

In the second mode of operation, a user is nowhere near the desired geographic vicinity but nevertheless desires information about items of interest at a destination location (for example, it is generally impractical to display all items of interest within a one hundred mile radius; rather it is more convenient to display locations of items of interest in a format that is relative to his desired destination). In one embodiment of the invention, such a user selects the "REMOTE-INFO" key 48 to access the desired set of destination position coordinates. For example, a user who is leaving Boston Logan Airport for Los Angeles International Airport (LAX) can access a port 16 at Logan and display, selectively, items of interest in an associated category relative to LAX. For example, if a user of the invention wishes to locate music stores upon arrival in Los Angeles, she can command the display of music stores relative to LAX so that they are easily located.

In order to command the display of items of interest at the destination location, and in accord with one embodiment of the invention, a user first selects "USA" at the port 16 via the keyboard 24, then the user sequentially selects "California," "Los Angeles," and finally "Los Angeles International Airport." Each of these selections are provided to the user in a menu format on the display 22, such as known to those skilled in the art.

Figure 3C:
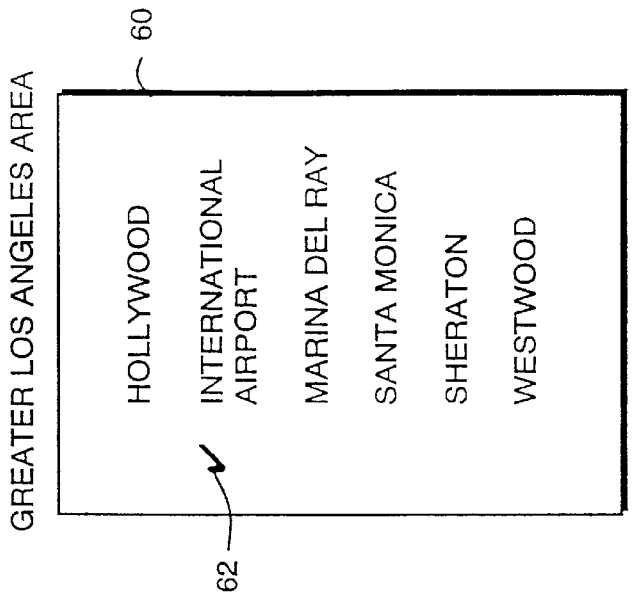
FIG. 3C shows a user interface display of various selectable locations within greater Los Angeles according to the invention and which can be displayed to a user of the system of FIG. 1.
Figure 3B:
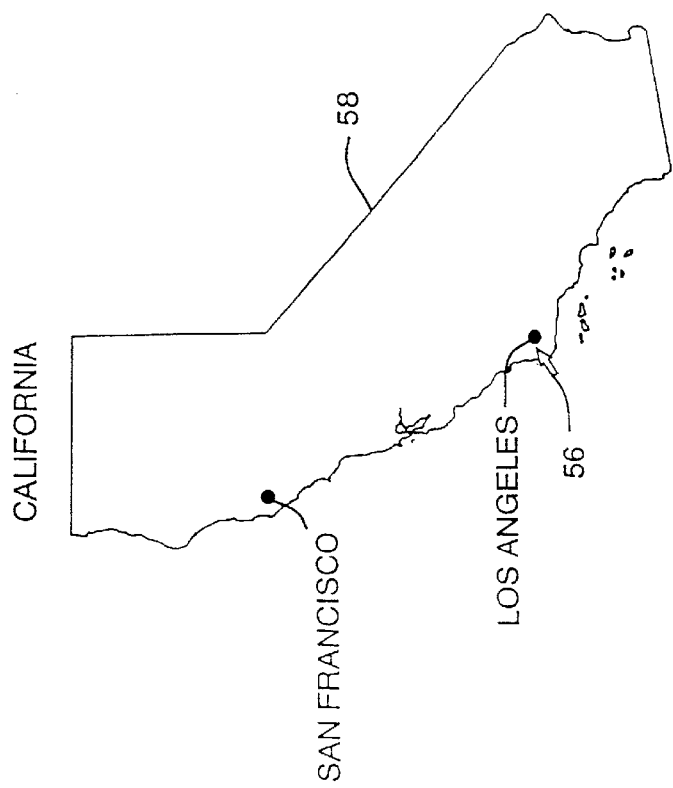
FIG. 3B shows a user interface display of a map of California providing selectable locations according to the invention and which can be displayed to a user of the system of FIG. 1.

FIGS. 3–3C schematically illustrate this display and selection process according to one embodiment of the invention. FIGS. 3–3C show successive displays which are displayed on the display 22, FIG. 1. Specifically, the system 10 of FIG. 1 first provides information to the display 22 that represents a selection 50 of various countries which can be selected by a user, such as shown in FIG. 3. In this example, a user selects the "United States" (such as shown by the check-mark 52). The system 10 thereafter provides information to the display 22 that represents a map 54 of the United States, shown in FIG. 3A, so that a user can point and select "California" with a mouse pointer 56 via the mouse tracker 25. Upon selection, an outline 58 of California is displayed, including many, if not all, of its major cities, as shown in FIG. 3B (for illustrative purposes, only Los Angeles and San Francisco are identified).

With the outline of California displayed, a user can select "Los Angeles" by again pointing the mouse pointer 56 onto the city identified as Los Angeles and clicking the mouse tracker 35. Thereafter, an alphabetic listing 60 of well-known places is provided by the system to the display 22, as shown in FIG. 3C, so that a user can, appropriately, select a geographic vicinity within which to locate the items of interest. In this example, a user would appropriately select Los Angeles International Airport, as illustrated with a check-mark 62.

As should be clear to those skilled in the art, the successive display of information within the display 22 can be accomplished in several ways, each of which is within the scope of the invention. For example, the display of information shown in FIGS. 3–3C can be done through menus only, and without the map illustrations shown in FIG. 3A and 3B. That is, a menu of information can replace the maps of FIGS. 3A and 3B, such as for example provided in FIGS. 3 and 3C. A menu of the United States, for example, at least includes a listing of the several states; and a map of California at least includes a menu listing of its major cities.

Likewise, the display of information on the display 22 can entirely be in graphical form. In such a case, the menus of FIG. 3 and 3C are replaced, respectively, with (i) graphical representations of the world, and (ii) graphical locations of key items of interest within the greater Los Angeles area.

Accordingly, the default display of information to a user monitoring the display 22 is a mixture of graphics and menus, such as shown in FIGS. 3–3C. However, a user can select only the display of graphic information by activating the "GRAPHICS" key 64, FIG. 1. Likewise, a user can also select the "MENU" key 66 to display information in the menu (text) mode. Those skilled in the art should appreciate that other keys, key names, and combinations of keys can be used in accord with the invention to select and/or display other information. For example, a print key 68 provides a command for printing the current display of the port 16, which therefore preferably includes an attached printer 70 connected via communication line 71.

Figure 4:
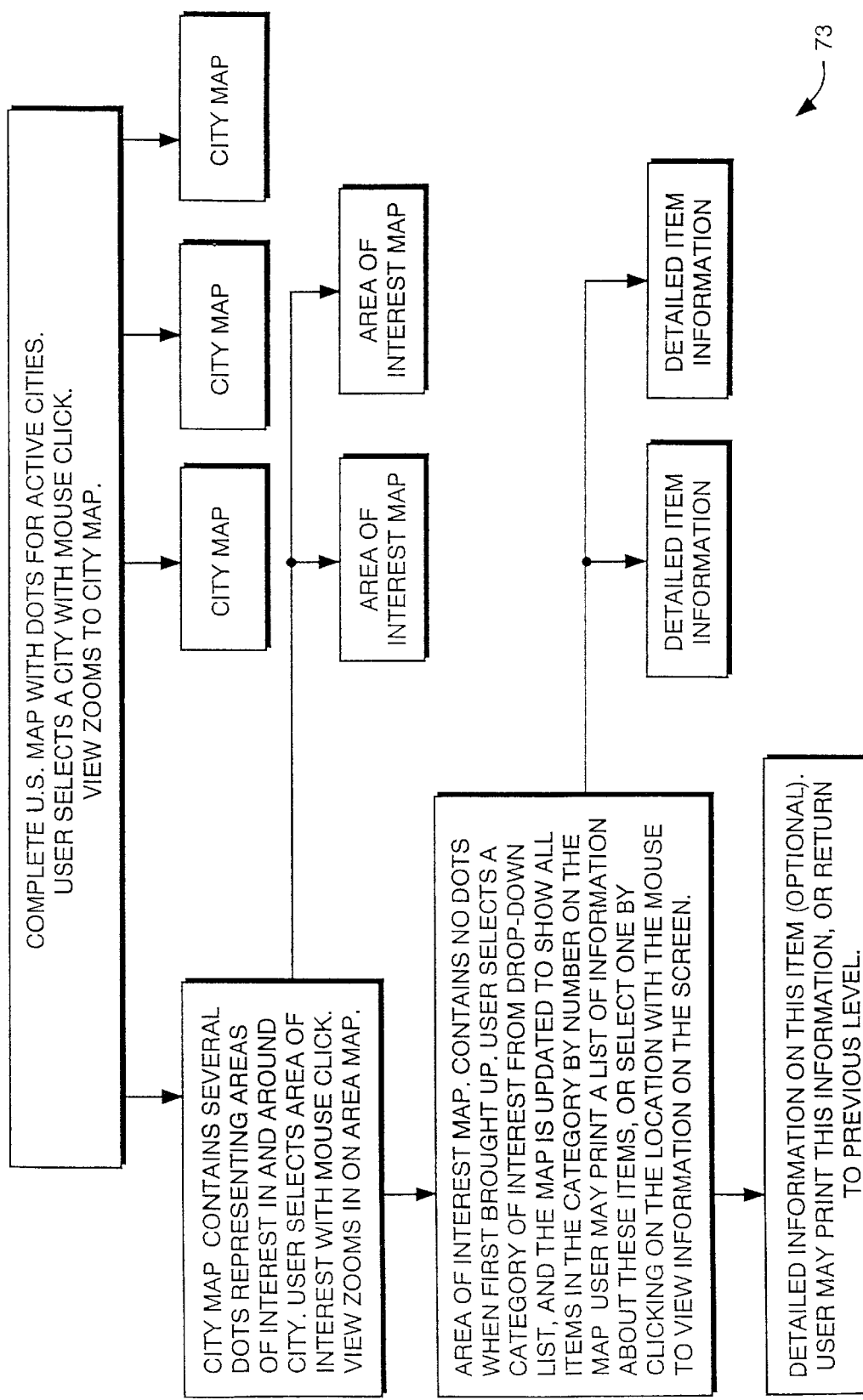
FIG. 4 illustrates a top level process flow, according to the invention, for providing information to a user at the remote port of FIG. 1.

FIG. 4 illustrates one embodiment of the invention showing a process flow 73 for providing information about selected items of interest to a user at the remote port.

The flow 73 includes instructions at different levels of abstraction, such as at the U.S. level, city level, and at the specific areas of interest, which help a user to select and locate the items of interest.

Thus, it is preferred, according to the invention, that a user's selected display of items of interest within an associated category and geographic vicinity is accessed hierarchically within the database 12. As such, each set of positional coordinates corresponds to a discrete remote port location of one geographic vicinity.

Figure 4A:
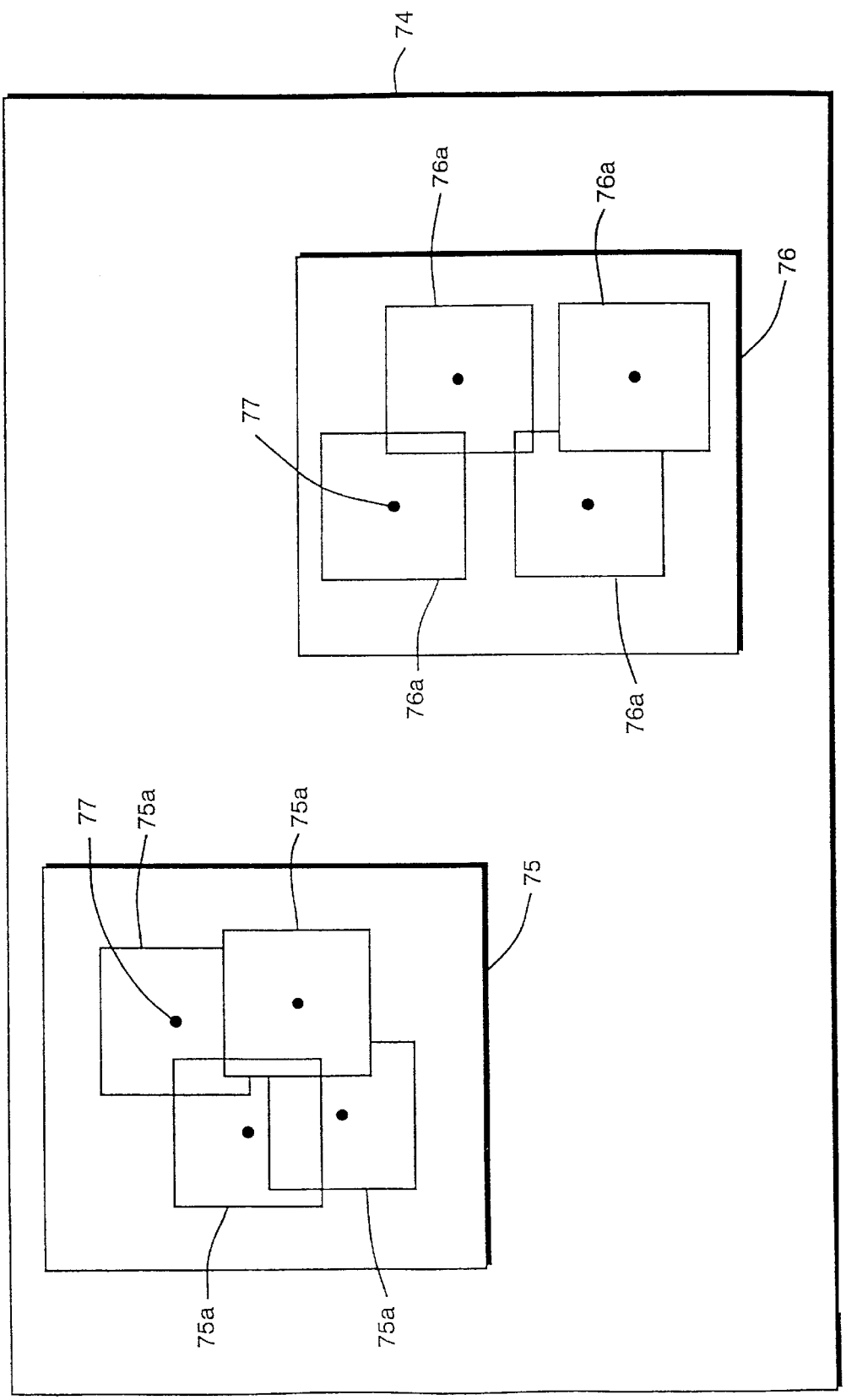
FIG. 4A shows a hierarchical structure of geographical vacinities, according to the invention.

FIGS. 4 and 4A illustrate this hierarchical approach. If, for example, a user at a remote port has commanded the display of one geographic vicinity (i.e., an area of interest map) and selects the display of a different geographic vicinity, it is necessary to first return to the associated city map, or even to the U.S. map, depending on the desired location, to access that different geographic vicinity.

FIG. 4A schematically illustrates this selection by way of a U.S. map 74 which includes two city maps 75, 76. The geographic vacinities 75a, 76a within each city map, respectively, are selectable by hierarchically selecting the appropriate city map first. In this manner, if a user is currently displaying one vicinity 74a, and desires a display of a vicinity 76a, the user must first successively select the city map 75, the U.S. map 74, and Hi the city map 76. FIG. 4A also illustratively shows the positional coordinates 77 for each vicinity 75a, 76a.

Figure 5:
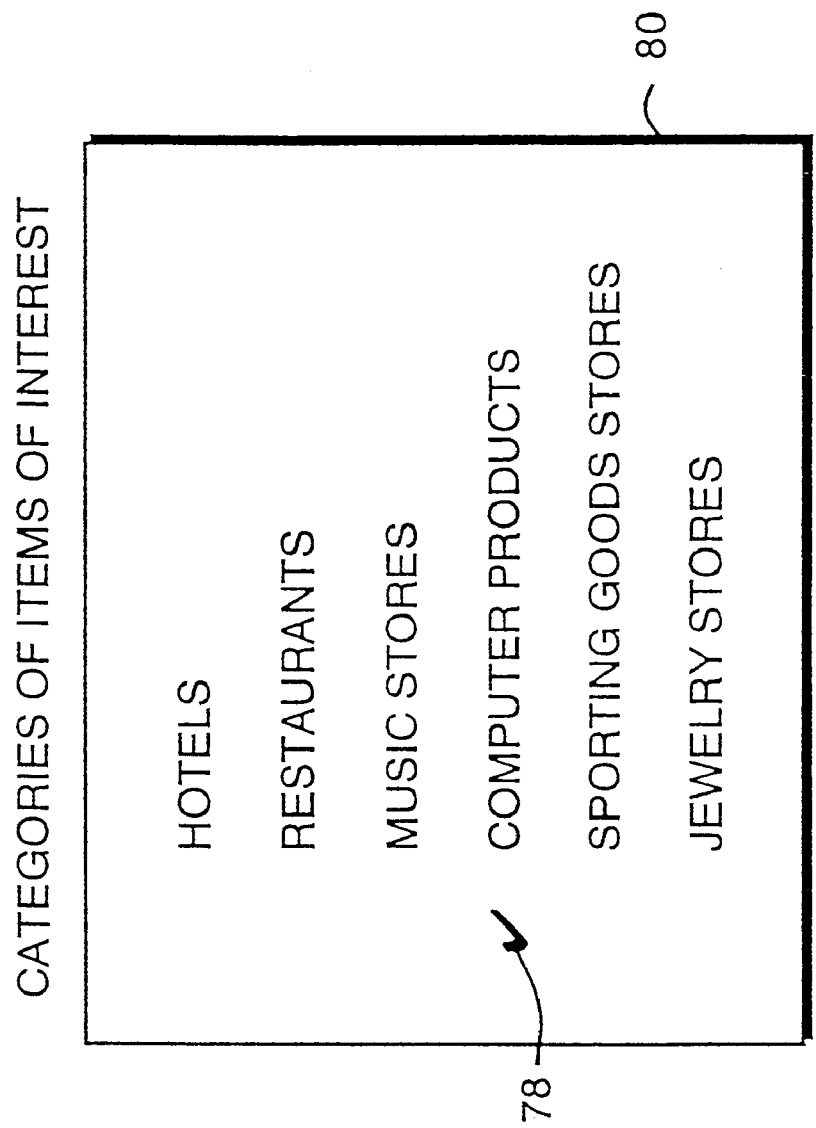
FIG. 5 shows a typical menu of categories of items of interest which are selectable by a user of the system of FIG. 1.

FIG. 5 illustrates one embodiment of the invention wherein a user selects the associated category for the items of interest from a display menu of possible items of interest. This display to select the category is preferably displayed upon activation of the remote port 16; or, alternatively, the display is commanded by a user of the system, such as by activating the "NEW SEARCH" key 76, FIG. 1. Accordingly, a user can start a new search for items of interest in a selected category by first pressing the "NEW SEARCH" key 76. Alternatively, a user can select an additional category by selecting the "ADD CATEGORY" key 46. In this manner, more than one category can be displayed at one time within the geographic vicinity.

By way of example, upon pressing the key 76, FIG. 5 illustrates one embodiment of the invention which provides a listing of possible categories of items of interest in a menu 78. A user of the system 10 can select-any desired category in the menu, such as by pointing and clicking on the selected item. In this example, the user has selected "computer products," a category which was used in the illustration of FIG. 2 and which shows the selection by a check-mark 78. A user can thereafter press the "ADD CATEGORY" key 46 and select one other desired category in the menu, such as "sporting goods stores".

Alternative to the embodiment shown in FIG. 5, another embodiment of the invention provides a word association technique, known to those skilled in the art, which allows any category of items of interest to be selected by directly typing the desired search area. For example, a user of the invention could press the "NEW SEARCH" key 76 and thereafter type "computer equipment" or "computers," or other similar association, and the controller 14 of FIG. 1 would determine the best fit to the possible categories stored in the database 12 to display to the user. If the association were narrow enough, the system 10 immediately displays the items of interest within the "computer products" category, as above. However, if the search is too broad, the system can prompt the user for more information (such as known to those skilled in the art). By way of example, if a user types "computers," the system can question, or prompt, the user at the port 16 for "products," "services," or "rentals," which can thereafter be selected by the user.

The advantages of a system constructed according to the invention are several. Specifically, the invention provides a selectable display of items of interest at nearly any location, remote from the user, or centered relative to the user within the desired geographical vicinity. Further, once the display of the selected items of interest is isolated, the system provides a hard-copy for the user to walk away with. With increased usage of the invention, a corresponding increase in the number of remote access ports provides flexibility for users who can, thereby, access the system from widely accessible commercial locations, e.g., airports, car rental agencies, and train stations. In addition, the remote access port of the invention can be located at a user's home, providing even greater flexibility for those persons who regularly travel (or who regularly need information about items of interest at a selected geographic vicinity). A person's home computer system provides data processing capability which, with a modem and software configured to communicate with the database, can provide many, if not all, of the features of the remote access port 16 described above. As such, the remote access port of the invention can include personal computers, subnotebooks, notebooks, Apple's Newton product, facsimiles, phones, cellular, mainframes, minis, interactive television and/or hybrid products.

Figure 6A:
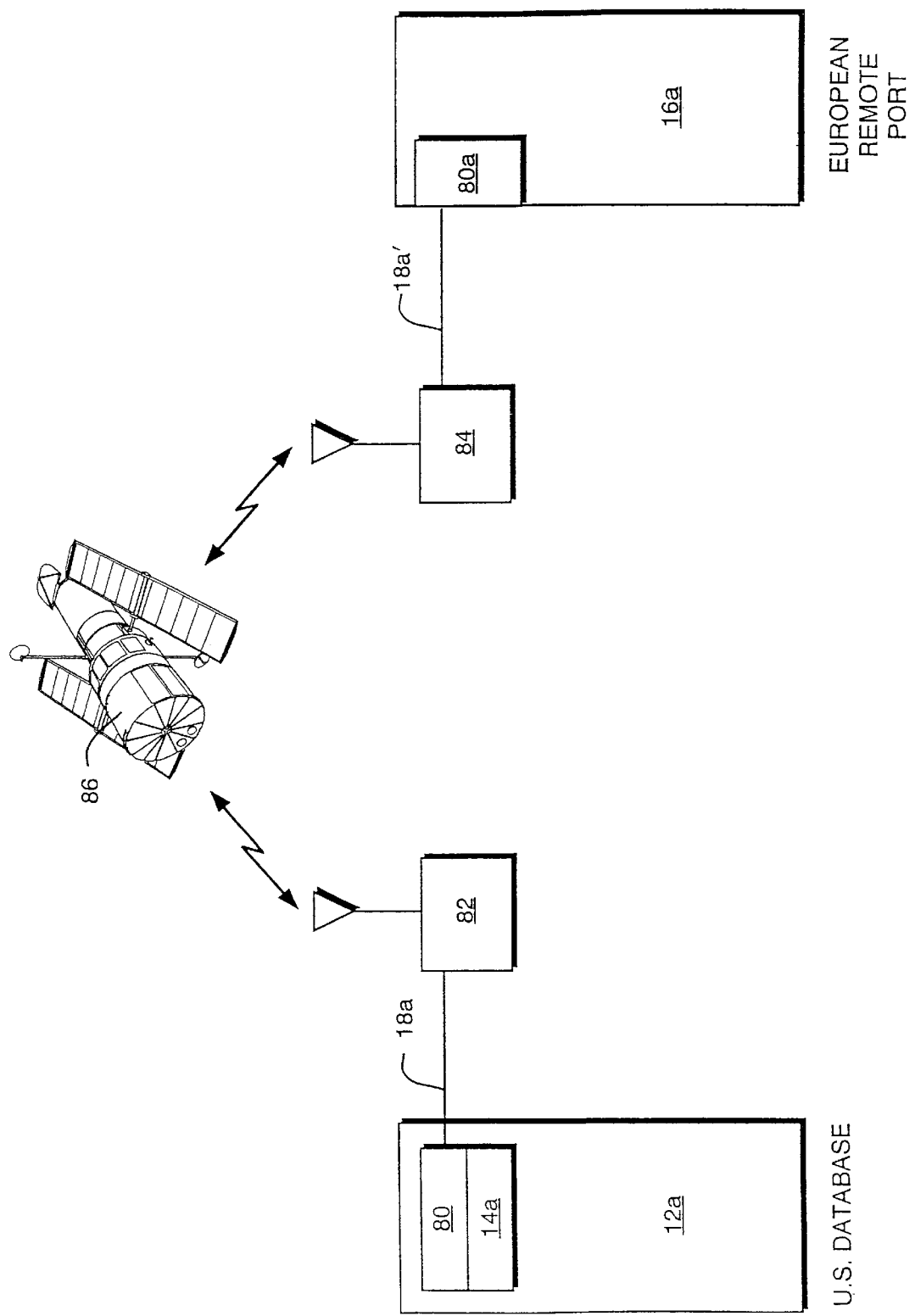
FIGS. 6A and 6B illustrate various components and methods, according to the invention, for constructing a communications link suitable for use in the system of FIG. 1.
Figure 6B:
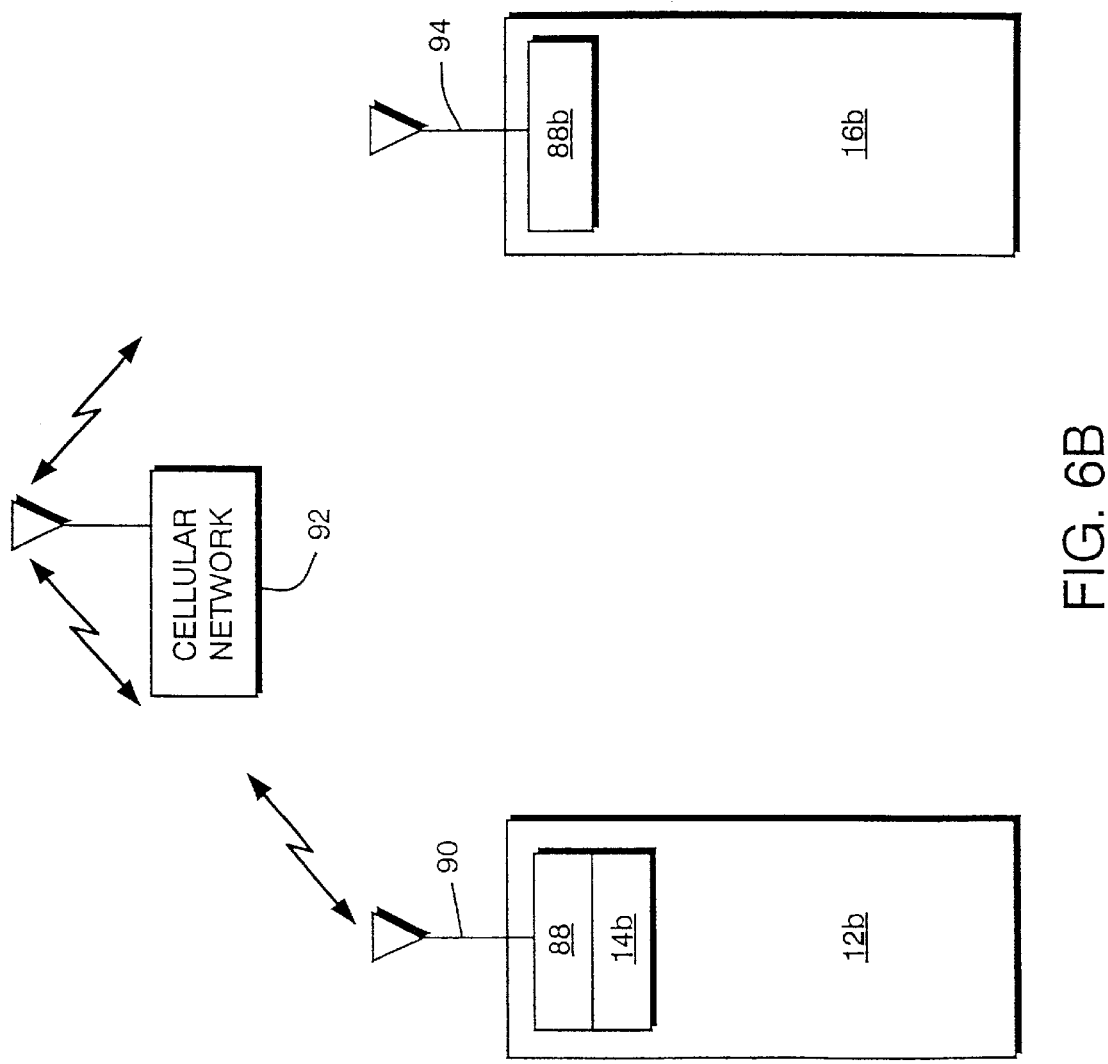

FIG. 6A illustrates a system, including a telephone-modem-satellite communications link, constructed according to the invention. Specifically, FIG. 6A shows a database 12a and controller 14a, which are illustratively located in the United States and which are similar to the database 12 and controller 14 of FIG. 1. The database and controller 12a, 14a connect and communicate with a remote port 16a, which is illustratively located in Europe and which is similar to the port 16 of FIG. 1. A modem 80 couples to the controller 14a, such as known to those skilled in the art, and further to a telephone line 18a. The telephone line 18a connects through the telephone network to the telephone relay center 82 which provides communications, such as overseas communications, to a remote relay center 84 via a satellite 86. The relay center 84 connects to the remote port 16a (including an internal modem 80a) by the land-based telephone line 18a' so that, in combination, a user of the remote port 16a can access information from the database such as described above.

It should be apparent to those skilled in the art, for example, that the lines 18a and 18a' can also be constructed with fiber-optic cabling, co-axial cabling, internet communications and the like.

FIG. 6B illustrates other embodiments of the invention for communicating between (i) the database 12b and controller 14b and (ii) the remote port 16b. A cellular communicator 88 connects to the controller 14b and communicates, via an antennae 90, with the established cellular communications network 92. The communications link is completed with the remote port 16b, including its own antenna 94 and cellular communicator 88b, so that a user of the port 16b can communicate, as above, with the database 12b.

It should again be apparent to those skilled in the art that the communications methods described and illustrated herein can be modified, in accord with the invention, to form other communication links. For example, portions of the communications link of FIG. 6A can be mixed with portions of the link of FIG. 6B to establish a working and acceptable link according to the invention.

Further, the communications link of FIG. 6B can be replaced with other communications mechanisms known to those in the art. For example, the antennas 90, 94 and communicators 88, 88b can be replaced by radiowave or microwave devices which communicate via a compatible network instead of a cellular network 92.

FIG. 7A illustrates one embodiment of the invention wherein a display 22c, such as the display 22 of FIG. 1, includes—or is replaced by—a hard-copy printer 100, such as a computer printer or facsimile. In such an embodiment, a user at the port 16c receives a hard-copy 102 of the interactive communications between the port 16c and the database 12, FIG. 1. As above, the user commands selective display of data via the keyboard 24c and/or mouse tracker 25c, and a display of the geographic vicinity with the selected items of interest in the selected category are provided via the printer 100.

It should be apparent to those skilled in the art that one acceptable remote port, according to the invention, includes a port comprising a printer 100 and a telephone (not shown). In such an embodiment, a user accesses the database by telephoning the database and requesting a display of items of interest in the selected category and geographic vicinity. The controller 14 of FIG. 1 can include voice recognition software and hardware, known to those skilled in the art, which prompts the user for requests and identifies and responds to the user's verbal replies. After identifying the user's desired category and present location (or intended destination location), the database transmits information in a form recognizable by the printer 100 so that the geographic vicinity and items of interest are displayed to the user at the telephone/printer remote port.

Alternatively, a user can fax selections for the category and geographic vicinity of interest as a hard-copy. A system administrator at the database can interpret the user's selection sheet and command the transmission of the requested information, including the items of interest, back to the user. Alternatively, the database can interpret the user's selections on the sheet to automatically respond and transmit the appropriate display of information, including the items of interest, to the user.

FIG. 7B shows another remote port 16d which includes a voice generation system 110 and speaker 112. In such an embodiment, a user at the port 16d (i) listens to questions, or reads messages on the display 22d, as prompted by the database, and (ii) answers the questions by the keyboard 24d. After the system identifies the user's desired geographic location and category, a print-out or display of the information is made available to the user, such as described above.

Figure 8:
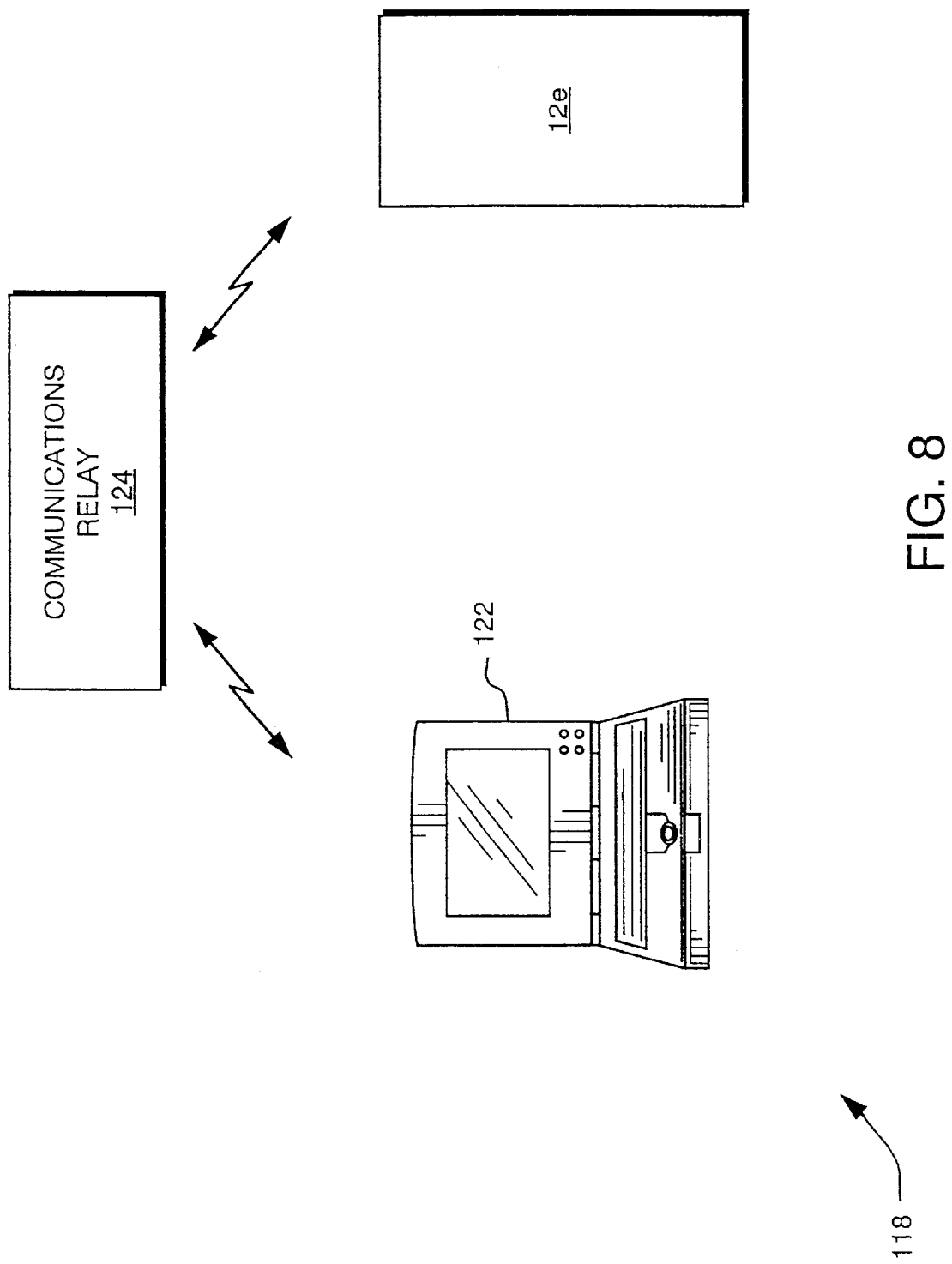
FIG. 8 illustrates a system constructed according to the invention and which includes a mobile remote port for accessing the locations of the selected items of interest.

FIG. 8 illustrates a mobile remote system 118 constructed according to the invention. A user holds one of several hand-held devices 122 which provide both display capability and transmit/receive capability to a remote relay 124, e.g., a cellular or radiowave communication relay. The device 122 thus operates as the remote port 16 of FIG. 1. The device 122 can additionally include a GPS receiver to accurately determine the user's positional coordinates in real-time, or a PCM CIA Type II or Type III modem interface which can be miniaturized to credit card size. Alternatively, the user can specify his position coordinates and transmit that information to the database 12e. In this illustrated embodiment, the system 118 continually redefines the geo-definition of the geographic vicinity based upon the positional coordinates of the user. Data is assembled and maintained using the positional coordinates to generate a map of the geographic vicinity relative to the user and including the locations of the items of interest. As above, this geographic vicinity is assumed to be within a walking distance of the user; however, the user can select a greater radius for display, or another destination location, as needed.

The invention generally incorporates software to facilitate the several embodiments described herein and to support the principles of the invention. As known to those in the art, the data within the database can be maintained, for example, on a SQL-server, or in xBASE. The software is preferably portable to other operating systems, such as to Apple, Apple/IBM, Unix, DEC, OS/2, DOS, Windows 3.1, Windows '95; and preferably allows scalability to 64-bit architectures and greater, as technology advances.

In accord with the invention, software code supporting the database interaction with the remote port can include object-oriented programming, Visual Basic, and other software architectures configured to allow user interaction, portability to other platforms, interface with the internet or other gateways, and relational management.

FIG. 9 illustrates one embodiment of database architecture 130 which is suitable for use as the database 12 of FIG. 1. Specifically, the architecture 130 includes separate phone and fax interfaces, 131, 132, respectively, to interface with any one of the remote ports, e.g., the port 16 of FIG. 1. FIG. 10 illustrates system architecture including database architecture 140 and remote port architecture 141 connected via a pair of phone lines 142, 143 to, respectively, a touch-tone phone 142a and fax machine 143a. In this manner, a user 144 can make requests and listen to responses on the phone 142a, and receive maps and instructions via the fax machine 143a.

Other modules within the database architectures 130 and/or 140 include the following:

Communications managers 133, 133' (FIGS. 9 and 10, respectively) handle all data transfers for a single internal modem (or telephone interface controller) 131 in the host database, e.g., a personal computer. It responds to remote requests for data by passing the requests to a session manager 138, and handles all modem control issues, such as answering incoming calls. The communications manager 133' of FIG. 10 is configured to service users who access the database from a remote port comprising a dial-up telephone 142a. As such, the manager 133' translates touch-tone inputs into data and fax transmission requests to be sent to the session manager 138, and monitors the line 142 for time-outs when a user 144 forgets to actively disconnect. The manager 133' can also translate data from the session manager 138 into synthesized voice output for presentation to an end user 144.

The fax manager 134 handles all requests from the session manager 138 to fax and receive documents to and from end users connected through a communications link.

Because there generally are a plurality of remote ports arranged for access to the system database, there are preferably a plurality of communications managers 133 and modems 131 to service requests from the remote ports. Likewise, although the database generally includes one fax manager 134 and one interface 132, a plurality of fax managers 134 and fax machine interfaces 132 can be incorporated therein. Accordingly, the host database can answer and service a variety of remote ports simultaneously.

The session manager 138 tracks and controls information for each active session being hosted by the database architecture. It responds to requests for data passed to it by each communications manager 133 operating in the database architecture, and prioritizes, queues, and forwards these data requests to the end user data server 136. The manager 138 also forwards data requests to the system data server 137 (FIG. 9 only) to log certain system information, such as user connection times, errors, system utilization, and other administrative functions.

In FIGS. 9 and 10, database storage memory 139 stores information which is accessible by the end user data server 136 and which is responsive to user requests, including the selected city, locations of items of interest, maps of geographic vacinities, and advertising information. In FIG. 10, an additional database storage memory 139a stores information which is accessible by the system data server 137 and which stores information such as system usage and transaction logging.

The end user data server 136 responds to requests from the session manager 138 by providing data that has been requested for transmission to the remote port. This data includes that information required to place items of interest on the selected geographic vicinity. Preferably, the end user data server 136 is the only mode of access to the specific map data, and thus all requests for this data are made through this server.

In FIG. 9, the system data server 137 interacts with the session manager 138 to record system administrative data. The server 137 responds to requests from the session manager 138 to provide or record information used to track system usage, system response times, user preferences, and other data items that are used to optimize the different modules within the architecture 130.

The flow and control of information by the information controller 14, FIG. 1, can include several of the functions shown illustratively in FIG. 11. Specifically, a display manager 150 controls the drawing of maps (i.e., geographic vacinities) on the screen 22 and further controls status messages to a user of the system. The manager 150 responds to requests for screen updates and status message display from a system kernel module 159, described in more detail below. It also sends requests to a map manager 151 when rendering maps to the display, and sends requests to a data manager 152 in order to obtain system information required to update the display 22 or to present status messages to the user.

A map manager 151 manages map data and provides data for drawing maps to the display manager 150. The manager 151 responds to requests from the display manager 150 by providing information appropriate to the current context of the session, such as the graphical image (e.g., the geographic vicinity and advertising information) that needs to be displayed, the locations on the screen 22 of the items of interest, and the location and content of the titles of the items of interest.

A data manager 152 handles all data requests from the system kernel module 159, map manager 151, and print manager 153, and further interfaces to external data sources 155, 156 (these databases 155, 156 store raw data as the database information). The manager 152 determines the need for remote data access via a communications manager 157, and passes on remote data requests to the manager 157. The manager 152 also provides all data access services to other managers and modules within the controller 14. For example, if the data is not stored locally, the data manager 152 sends a request to the communications manager 157 to provide the desired data.

A print manager 153 handles and controls printing activities in the system, such as to a connected printer 154 (similar to the printer 110, FIG. 7C; or such as a printer connected directly to the database 12). By way of example, the manager 153 requests map and other data from the data manager 152 to create and print outputs requested by the system kernel module 159. Specifically, the manger 153 responds to requests from the system kernel module 159 for print services, and sends requests to the data manager 152 based upon the system kernel requests. The manager 153 uses the information supplied by the data manager 152 to create formatted output for printing, such as by utilizing a standard Windows™ print driver interface to print the requested output.

The communications manager 157 handles all remote communications requirements, including remote data requests, and further accepts and transfers raw data from a remote data source 158 (such as data downloads to modify or add to data within the database). The manager 157 responds to requests from the system kernel module 159 for initialization, connection, and shutdown of remote connections appropriate with the actual hardware in use. It also responds to remote data requests from the data manager 152 by sending the request for remote data to the remote data source 158. When the remote data source 158 responds to the request, the communications manager 157 passes that response on to the data manager 152.

The system kernel module 159 traps all user inputs and determines required actions in the system, including those actions responsive to a user's inputs 160 (such as described above in connection with the keyboard 24). Specifically, the module 159 responds to mouse movements, mouse button clicking, and typing. Depending on the user's input, the module 159 will send requests for services to (i) the display manager 150 to update the display, (ii) the data manager 152 to provide information concerning the map and/or other system needs, (iii) the print manager for printing services, and (iv) the communications manager 157 for remote communications services.

FIG. 12 illustrates one preferred embodiment of the invention wherein certain advertising information is included within, or attached to, the geographic vicinity which is displayed or printed to a user at a remote port. For example, FIG. 12 shows one illustrative geographic vicinity 30' which was shown previously in FIG. 2, except that an advertisement 180 is displayed as part of that vicinity (the advertisement 180 is generically shown with the text "ADVERTISEMENT," when, in fact, a paying customer's name or company is usually displayed at that location). In the normal use of the invention, the advertiser who pays for the advertisement is generally associated with the items of interest being displayed. For example, a credit card bank or sporting goods manufacturer typically specify (and pay for) the "advertisement" logo or wording.

It should be apparent to those skilled in the art that any of the items of interest within a displayed geographic vicinity can be selected by a user and that the database can thereafter supply additional detail about that selected item of interest. In such an embodiment of the invention, the database is configured to store such additional detail and also to transmit this information to the remote port when selected. The remote port, in turn, displays the information for the user. By way of example, if the selected category is "restaurants" and a user selects a particular restaurant (i.e., one of the items of interest), a display of additional detail can, for example, include a digital picture of the layout of the dining room or bar. Additionally, the entertainment scheduled for that evening can be displayed while a recording of any associated music is played at the remote port's speakers.

Thus, a further embodiment of the invention includes a digitized, multi-media presentation that is transmitted to the remote port when an associated item of interest is selected. Using a camrecorder and/or other video capture, storage, and editing analogue or digital devices, for example, a short video clip is embedded in the data associated with the information about the items of interest and transmitted and displayed when selected.

In order to utilize the above-described multi-media presentation, the system of the invention must provide sufficient bandwidth, processing speed, and display resolution, and the remote port must display the multi-media transmissions with sufficient speed and resolution so as to be convenient to the user of that information. Typically, the minimum central processing unit of the database and remote port run at least at 16 MHZ and is based on a CISC (complex instruction set) architecture. Further, the database, remote port and communications link should be able to transmit data at an uncompressed speed of 9600 baud per second; preferably, these devices should be faster, e.g., 28.8 Kbps, utilizing modems that subscribe to emerging industry standards such as V.34. Additionally, special connections may be required at the server, including what are known to those skilled in the art as SLIP, PPP, and TC/ICP protocols. In some cases, where additional bandwidth may be required, the modem is replaced with special interfaces provided by regional telecommunications systems that also provide dedicated optic fiber cabling. Some of those linkages are known as Ti, ISDN, and 56 Kbps wide band-width connections. In addition, bandwidth may be enhanced by microwave and other communication links that do not require direct cabled connections.

The invention thus attains the objects set forth above, in addition to those apparent from the preceding description. Since certain changes may be made in the apparatus and methods described herein without departing from the scope of the invention, it is intended that all matter contained in the above description or shown in the accompanying drawing be interpreted as illustrative and not in a limiting sense.

It is also understood that the following claims cover all the specific and generic features of the invention described herein, and all statements of the scope of the invention which, as a matter of language, might be said to fall there between.

What is claimed is:

1. A system for determining the position of one or more items of interest in a selected category, comprising:
    a database for storing information about the items of interest, the information including, for each of the items of interest, at least one associated category and spatial detail defining a geographic position; and
    a plurality of ports for accessing the database through the Internet, each port having a user interface for accepting inputs by a user of the system and for indicating to the user the geographic position of one or more of the items of interest, the user inputs defining the category associated with items of interest.

2. A system of claim 1, wherein the items of interest comprise one or more business categories.

3. A system of claim 1, wherein the port comprises a computer display.

4. A system of claim 1, wherein the port comprises a printer.

5. A system of claim 1, wherein the database further comprises additional detail about at least one item of interest, such that the user can access the additional detail through the user interface.

6. A system of claim 5, wherein the additional detail comprises information about the one item of interest.

7. A system of claim 6, wherein the additional detail comprises an advertisement about the one item of interest.

8. A system of claim 1, wherein at least one of the ports comprises a graphic display.

9. A system of claim 1, wherein at least one of the ports comprises a voice-recognition user interface to accept inputs from the user.

10. A system of claim 1, wherein at least one of the ports comprises a speaker for indicating to the user the position of at least one item of interest.

11. A system of claim 1, wherein at least one of the ports repeatedly updates its geographic position as input to the system.

12. A system of claim 1, wherein at least one of the ports automatically updates and displays its position for the user.

13. A system of claim 12, wherein at least one of the ports comprises a GPS receiver for defining a geographic position of the user.

14. A method for determining the position of one or more items of interest in a selected category, comprising:

storing information about the items of interest in a database, the information including, for each of the items of interest, at least one associated category and spatial detail defining a geographic position; and supplying information about at least one of the items of interest to one of a plurality of ports, connected to the database at least in part through the Internet, in response to inputs at the one port, wherein a user at the port may locate the one item of interest.

15. A method of claim 14, wherein the step of supplying comprises relaying information through a cellular communications link to a phone.

16. A method of claim 14, further comprising the step of hierarchically displaying geographical information at the one port in response to user inputs at the port.

17. A method of claim 14, wherein the step of supplying comprises relaying information through a cellular communications link to a laptop computer.

18. A method of claim 14, wherein the step of supplying comprises supplying the information items within a radius about the one port.

19. A method of claim 18, further comprising selecting the radius at the remote port.

20. A method of claim 14, further comprising inputting a distinct address at the remote port.

21. A method of claim 14, wherein the step of supplying information comprises supplying advertising information about a business.

22. A method of claim 21, further comprising storing the advertising information in a database and updating the advertising information remotely from the database.

23. A method of claim 21, wherein the step of supplying information comprises supplying one or more of video clips and digitized images related to the one item of interest.

* * * * *

US006415291C1

(12) EX PARTE REEXAMINATION CERTIFICATE (7052nd)

United States Patent
Bouve et al.

(10) Number: US 6,415,291 C1
(45) Certificate Issued: Sep. 8, 2009

(54) SYSTEM AND METHODS FOR REMOTELY ACCESSING A SELECTED GROUP OF ITEMS OF INTEREST FROM A DATABASE

(75) Inventors: W. Lincoln Bouve, Milton, MA (US); William T. Semple, Arlington, VA (US); Steven W. Oxman, Riva, MD (US)

(73) Assignee: Civix-DDI, LLC, Boulder, CO (US)

Reexamination Request:
No. 90/008,329, Jan. 23, 2007

Reexamination Certificate for:
Patent No.: 6,415,291
Issued: Jul. 2, 2002
Appl. No.: 09/816,829
Filed: Mar. 23, 2001

Related U.S. Application Data

(63) Continuation of application No. 08/920,044, filed on Aug. 28, 1997, now Pat. No. 6,408,307, which is a continuation of application No. 08/371,425, filed on Jan. 11, 1995, now Pat. No. 5,682,525.

(51) Int. Cl.
*G06F 17/30* (2006.01)
*H04L 29/08* (2006.01)

(52) U.S. Cl. ............ 707/10; 701/201; 701/208; 707/104.1; 707/3; 707/E17.018; 709/218
(58) Field of Classification Search .......... 370/312; 340/541; 707/203; 715/201
See application file for complete search history.

(56) References Cited

U.S. PATENT DOCUMENTS

| 4,697,281 A | 9/1987 | O'Sullivan |
| 4,706,081 A | 11/1987 | Hart et al. |
| 4,714,995 A | 12/1987 | Materna et al. |
| 4,866,704 A | 9/1989 | Bergman |
| 4,872,157 A | 10/1989 | Hemmady et al. |
| 4,872,158 A | 10/1989 | Richards |
| 4,872,159 A | 10/1989 | Hemmady et al. |
| 4,872,160 A | 10/1989 | Hemmady et al. |
| 4,875,206 A | 10/1989 | Nichols et al. |
| 4,894,824 A | 1/1990 | Hemmady et al. |

(Continued)

FOREIGN PATENT DOCUMENTS

JP H4-261576 9/1992

OTHER PUBLICATIONS

Zijderhand et al., "Functions and Applications of Socrates: A Dynamic In–Car Navigation System with Cellular–Radio Based Bi–Directional Communications Facility," Vehicle Navigation & Information Systems Conference Proceedings, Aug. 31–Sep. 2, 1994, pp. 543–546 (EXP016099–EXP016103).Z (Continued)

*Primary Examiner*—Christopher E Lee

(57) ABSTRACT

A user can access a common database from a remote communications port, at any qualified location, to generate a map or other positional information which locates selected items of interest, e.g., business, stores, architectural sites, and the like. The database contains information representing the items of interest, including, for each of the items of interest, positional coordinates, a geographic vicinity, and a selected category. The positional coordinates discretely locate the vicinity, while the vicinity specifies the exact locations of the items of interest in the selected category. For example, a user in New York can select the display of sporting shops in the area surrounding Chicago O'Hara International Airport selectively. A user can also access a port and display locations of items of interest within the same vicinity as the user and relative to the user's position. The database can be modified from qualified remote locations to change, or add to, the information therein. An advertisement can be tagged to the display or print out as an association with the selected items of interest.

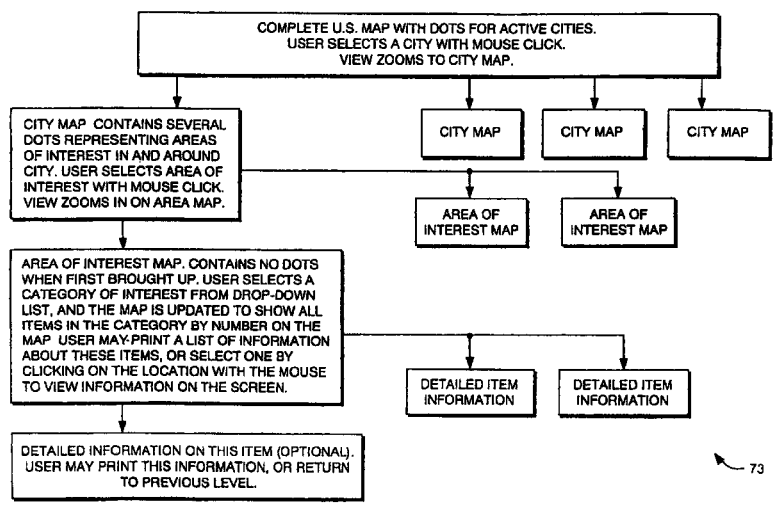

U.S. PATENT DOCUMENTS

| | | | |
|---|---|---|---|
| 4,896,319 A | | 1/1990 | Lidinsky et al. |
| 4,899,333 A | | 2/1990 | Roediger |
| 4,922,486 A | | 5/1990 | Lidinsky et al. |
| 4,962,473 A | * | 10/1990 | Crain .......................... 340/541 |
| 4,977,582 A | | 12/1990 | Nichols et al. |
| 5,014,221 A | | 5/1991 | Mogul |
| 5,032,989 A | | 7/1991 | Tornetta |
| 5,095,480 A | | 3/1992 | Fenner |
| 5,124,984 A | | 6/1992 | Engel |
| 5,142,622 A | | 8/1992 | Owens |
| 5,163,131 A | | 11/1992 | Row et al. |
| 5,185,860 A | | 2/1993 | Wu |
| 5,204,961 A | | 4/1993 | Barlow |
| 5,212,645 A | | 5/1993 | Wildes et al. |
| 5,214,694 A | | 5/1993 | Furuya et al. |
| 5,224,098 A | | 6/1993 | Bird et al. |
| 5,243,596 A | | 9/1993 | Port et al. |
| 5,265,239 A | | 11/1993 | Ardolino |
| 5,287,496 A | * | 2/1994 | Chen et al. .................. 707/203 |
| 5,481,535 A | * | 1/1996 | Hershey ...................... 370/312 |
| 5,481,664 A | * | 1/1996 | Hiroya et al. ............... 715/201 |
| 5,528,501 A | | 6/1996 | Hanson |
| 5,543,789 A | | 8/1996 | Behr et al. |
| 5,544,061 A | | 8/1996 | Morimoto et al. |
| 5,544,315 A | | 8/1996 | Lehfeldt |
| 5,584,025 A | | 12/1996 | Keithley et al. |
| 5,771,354 A | | 6/1998 | Crawford |
| 5,786,789 A | | 7/1998 | Janky |
| 6,122,520 A | | 9/2000 | Want et al. |
| 6,173,045 B1 | | 1/2001 | Smith |
| 6,289,390 B1 | | 9/2001 | Kavner |

OTHER PUBLICATIONS

Ang et al., "A New Region Expansion to Quadtrees," IEEE Transactions on Pattern Analysis and Machine Intelligence, Jul. 1990, vol. 12, No. 7, pp. 682–686 (EXP025345–EXP025350).

Blanco, Rock, "Electronic Markets Bring it All Back Home," Corporate Computing, V. 1, No. 2, pp. 101–102 HOME0059653–0059654).

Freedman, Eric, "PCs Prove to be the Real Estate Thing," PC Magazine, Mar. 3, 1985, p. 60 (HOME0059656).

Nelson, Stephen, "Using Prodigy", Que Corporation, 1990, pp. 101–130.

GIS World, vol. 4, No. 7, Oct. 1991, pp. 1–136 (EXP032588–032727).

"Starting today, the way you find a home will never be the same," HomeView, Inc. screen shots, Nov. 13, 1991, Bates Nos. HOME005930 –HOME0059360, Exhibit 1 to the Declaration of Robert Norton.

"HomeView™ Executive Summary," 1991, PicNet International, Inc., Bates Nos. HOME0059416 –HOME0059417, Exhibit 3 to the Declaration of Robert Norton.

"HomeView™ The Best Way to Buy Your Next Home," Custom Catalog printed for John and Mary Doe, Sep. 24, 1990, pp. 1–29, HomeView, Natick, MA, Bates Nos. HOME0059548–HOME0059579, Exhibit 11 to the Declaration of Robert Norton.

"List your home with a HomeView REALTOR® and start packing," 1992, HomeView, Inc., Bates Nos. HOME0059580–HOME0059581, Exhibit 12 to the Declaration of Robert Norton.

"Finally, there's a better way to buy a home", 1992, Homeview, Inc., Exhibit 12 to the Declaration of Robert Norton, Bates No. HOME0059582, Exhibit 12 to the Declaration of Robert Norton.

"Finally, brokers get a break, " HomeView™ Really Search Centers brochure, 1991, HomeView, Inc., Bates Nos. HOME0059583–HOME0059586, Exhibit 12 to the Declaration of Robert Norton.

"That was then. This is now." HomeView™ flyer, 1992, HomeView, Inc., Bates Nos. HOME0059587–HOME0059588, Exhibit 12 to the Declaration of Robert Norton.

"Starting today, the way you find a home will never be the same." HomeView™ brochure, circa 1993, HomeView, Inc., Bates Nos. HOME0059589–HOME0059592. Exhibit 12 to the Declaration of Robert Norton.

"A View With a Room," Entrepreneur, Mar. 1992, Bates Nos. HOME0059593–HOME0059594, Exhibit 13 to the Declaration of Robert Norton.

"Home buyers shop using multimedia," USA Today, Oct. 2, 1992, Bates No. HOME0059595, Exhibit 13 to the Declaration of Robert Norton.

"High–Tech Home Buying," Newsweek, p. 5, Jun. 1, 1992, Bates No. HOME0059596, Exhibit 13 to the Declaration of Robert Norton.

Cove, Lynda, "A new meaning to home delivery," The Boston Herald, Real Estate Pullout Section, Jan. 10, 1992, Bates No. HOME0059597, Exhibit 13 to the Declaration of Robert Norton.

"Century 21 Dwyer & Stillton is Member Broker with Home View," Hanover South Shore News, Sep. 25, 1992, Bates No. HOME0059598, Exhibit 13 to the Declaration of Robert Norton.

"What's New," Popular Science, p. 16, May 1992, Bates No. HOME0059600, Exhibit 13 to the Declaration of Robert Norton.

"Homeview announces equity investment by IBM," Home View™ Realty Search Services press release, Sep. 16, 1992, Bates No. HOME0059601, Exhibit 13 to the Declaration of Robert Norton.

Brickman, Sue, "House hunting," Real Estate Update, Jan. 17, 1992, Bates No. HOME0059602, Exhibit 13 to the Declaration of Robert Norton.

"Home–Shopping Networks," Inc., p. 53, Mar. 1993, Bates No. HOME0059604, Exhibit 13 to the Declaration of Robert Norton.

Labanca, Lisa, "IBM backing HomeView," Middlesex News, Sep. 17, 1992, Bates No. HOME0059605, Exhibit 13 to the Declaration of Robert Norton.

Rosenberg, Ronald and Ackerman, Jerry, "IBM Moves into HomeView," The Boston Globe, Sep. 16, 1992, Bates No. HOME0059606, Exhibit 13 to the Declaration of Robert Norton.

"Joyce Cook Realtors adopts HomeView," Salem Evening News, Business Highlights, Sep. 18, 1992, Bates No. HOME0059607, Exhibit 13 to the Declaration of Robert Norton.

"Virtual Real Estate," Lear's, May 1992, Bates No. HOME0059608, Exhibit 13 to the Declaration of Robert Norton.

Barrett, Bob, "Home buyers: Let your fingers do the walking," The Patriot Ledger, Dec. 20, 1991, Bates No. HOME0059609, Exhibit 13 to the Declaration of Robert Norton.

"Looking for a House on a Computer Screen," The Wall Street Journal Marketplace, Mar. 23, 1992, Bates No. HOME0059610, Exhibit 13 to the Declaration of Robert Norton.

"Marblehead Properties [sic.] part of computer database," Swampscott Reporter, Sep. 3, 1992, Bates No. HOME0059611, Exhibit 13 to the Declaration of Robert Norton.

Bianchi, Alessandra, "Home–Shopping Networks," New Businesses, Inc., p. 53, Mar. 1993, Bates No. HOME0059612, Exhibit 13 to the Declaration of Robert Norton.

"Home Finder," Popular Science, vol. 240, No. 5, May 1992, Bates Nos. HOME0059613–HOME0059614, Exhibit 13 to the Declaration of Robert Norton.

"Realtor joins digital sales service," Haverhill Gazette, Sep. 9, 1992, Bates No. HOME0059615, Exhibit 13 to the Declaration of Robert Norton.

Eng, Paul M. Ed., "Three Bedrooms, River View? I'll Punch That Right Up," Business Week, Jan. 20, 1992, Bates No. HOME0059617, Exhibit 13 to the Declaration of Robert Norton.

"The Home–Shopping Network,": CIO The Magazine for Information Executives, Mar. 1992, Bates No. HOME0059618, Exhibit 13 to the Declaration of Robert Norton.

Phelps, Dan, "A unique way to search for a home," Needham Times, vol. 25, No. 4, Jan. 16, 1992, Bates No. HOME0059619, Exhibit 13 to the Declaration of Robert Norton.

"Home buyers shop using multimedia," USA Today, Oct. 2, 1992, Bates No. HOME0059620, Exhibit 13 to the Declaration of Robert Norton.

"Front–runners: The Victor Company, Inc. Realtor offices are now HomeView member brokers," The Eagle–Tribune, Sep. 25, 1992, Bates No. HOME0059622, Exhibit 13 to the Declaration of Robert Norton.

Ackerman, Jerry, "ZAP! Real estate shopping meets the computer age," The Boston Sunday Globe, Nov. 22, 1992, Bates No. HOME0059623, Exhibit 13 to the Declaration of Robert Norton.

User's Guide, "Automap Pro", Microsoft, 1995, pp. PA–5233 to pa–5418.

05–C–6869; Homestore's Fourth Supplemental Response to Civix's interrogatory No. 3 and Fourth Supplemental Response to Civix's Interrogatory No. 9; Aug. 17, 2007 (386 pages).

Barbara Sturken, American Introduces Commercial Sabre, Travel Weekly, 1986 (HOME0215606 –HOME0215609).

Werner Hafner, Tripping Through Online Travel Services, Fairfield County Business Journal—High Beam Research 1992 (HOME0215603 –HOME0215605).

Michael Banks, The Modern Reference, Third Edition, Brady Publishing, 1992 (pages of book including pp. 1–355 and 358–815).

Steven Putz, Interactive Information Services Using World–Wide Web Hypertext, First International Conference on World–Wide Web ISTL–QCA–1994–03–01, 1994 (EXPO 25440 –EXPO 25447).

David Crossley and Tony Boston, A Generic Map Interface to Query Geographic Information Using the World Wide Web, www.w3j.com/1/Crossley.002/paper/002.html, 1995 (pp. 723–735).

Ed Taylor, Demystifying TCP/IP, Woodware Publishing, Inc., 1993 (pp. 1–20).

Alana Kainz, The Ottawa Citizen, Real Estate Section, Dec. 19, 1992 (pp. 1–3).

GIS Approach to Digital Spatial Libraries, ESRI, 1994 (HOME0215402 –HOME0215450).

H.G. Campbell, Georgraphic Information Systems Education for Non–Computer Oriented College Students, SIGCSE Bulletin, 1994 (pp. 11–14).

CompuServe Made Easy, Mentor Technologies, 1992 (HOME0215386 –HOME0215394).

Floyd Wilder, A Guide to the TCP/IP Protocol Suite, ARTECH House, 1993 (pages of book including pp. 1–313).

Lawrence Magid, Cruising Online, Random House, 1994 (pages of book including pp. 1–401 and pp. 404–481).

Dylan Tweney, The Traveler's Guide to the Information Highway, Ziff Davis Press, 1994 (164 total pages including pp. 1–139).

David Carlson, The Online Timeline, iml.jou.ufl.edu/carlson/1990s/shtml, 1999 (HOME0215640 –HOME0215656).

Vic Sussman, The Internet Will Gain Popularity, Problems, U.S. News and World Report, 1994 (1 page).

Hiawatha Bray, Microsoft's New Software Clicks for the Folks Who Don't Do Windows, Knight Ridder/Tribune News Service, 1995 (2 pages).

Nadine Godwin, Sabre to Allow Its Subscribers to Load Others' PC Software, Travel Weekly, 1989 (3 pages).

Lichty, Tom, "America Online's Internet, Macintosh Edition," Ventana Press, 1994 (DOC 09703 –DOC 10025).

Michelle Johnson, Tech Speak, The Boston Globe, Section: Business; downloaded from http://nl.newsbank.com/nl–search/we/Archives?p_action=print; Dec. 2, 1994 (p. 67).

Michelle Johnson, Tech Speak, The Boston Globe, Section: Business; downloaded from http://nl.newsbank.com/nl–search/we/Archives ?p_action=print; Dec. 23, 1994 (p. 31).

Christopher A. Poterala and Julius Ariail, PACS–L Archives—Feb. 1994, week 1 (#45), downloaded from http://listserv.uh.edu/cgi–bin/wa?A2=ind9402a&L=pacs–I&P=4949 on Dec. 13. 2007 (2 pages).

Sashi Shekhar et al., "An Intelligent Vehicle Highway Information Management System," Microcomputers in Civil Engineering (1993) (EXP 017078–102).

"Implementation of a Wide Area Information Server (WAIS) Software to Disseminate Spatial Data on the Internet," Proceedings of the Thirteenth Annual ESRI User Conference, 1993, (EXP 030477–488).

Licht, Mark "Delivering IVHS to the Marketplace: A Provider's Perspective", Proceedings of the IEEE–IEE Vehicle Navigations Systems Conference, Ottawa, Ontario, Oct. 12–15, 1993 (EPX 025493–97).

Masatoshi, Arika Wa, "Personal Dynamic Maps Based on Distributed Geographic Information Services," Vehicle Navigation & Information Systems Conference Proceedings, Yokahama, Japan, Hiroshima City University, Aug. 31–Sep. 2, 1994 (EXP 025529–35).

Brown, Alison; Silva, Randy, "Tidget TIM Mayday System for Motorists,"IEEE 1994 Position, Location and Navigation Symposium, Apr. 1–15, 1994 (EXP 025541–48).

Yang, Thomas T.; Yip, Kai Yan, "Use of Mobitex Wireless Wide Area Networks as a Solution to Land–Based Positioning and Navigation," IEEE 1994 Position, Location and Navigation Symposium, Apr. 11–15, 1994 (EXP 025559–66).

Reddy, Prasuna; Grant, Paul; Jovanis, Paul; Kitamura, Ryuichi, "Dynamic Electronic Yellow Pages Using Arc/Info" Proceedings of the Fourteenth Annual ESRI User Conference, May 1994 (EXP 025484–92).

Bowen, Charles; Peyton, David, "CompuServe Information Manager, The Complete Sourcebook," Bantam Books, 1990.

"Vendor Goal: 15,000 Sabrevision Units On Line By year's End," Travel Weekly, Feb. 8, 1993 (Factiva Archive).

Del Rosso, Laura, "Automation Trends 'Bode Well' For Agencies, SABRE Official Says," Travel Weekly, Mar. 2, 1992 (Factiva Archive).

PC Expo Nov. 19–21: Chicago IL., Multimedia & Videodisc Monitor, Future Systems, Inc., Feb. 1, 1992.

*Cellular Radio Systems,* edited by Balston, D.M. et al., (Artech House Boston) (1993) (pp. 295–297).

Hrut, Christopher B (Sep. 1993) "Navigation Technologies Executive Summary" Presentation at Mobile World Expo 1993 in San Jose, CA.

Levy S., et al. "Telnet X.3 PAD Option" RFC1053 (Apr. 1988) retrieved from the Internet www.ietf.org/rfc/rfc1053.txt; retrieved on Aug. 3, 2006.

Onions, J., et al., "ISO–TPO bridge between TCP and X.25" (Dec. 1988), available at http://www.isi.edu/in–notes/rfc1086.txt, retrieved on Aug. 9, 2006.

Romkey, J, RFC1055 "A Nonstandard for Transmission of IP Datagrams Over Serial Lines: SLIP" (Jun. 1988) available at http://www.ietf.org/rfc.rfc1055.txt?number=1055 retrieved on Aug. 9, 2006.

Rose, Marshall T., et al., RFC1006 "ISO Transport Service on top of the TCP Version: 3" Northrop Research and Technology Center (May 1987), available at http://www.ietf.org/rfc/rfc1006.txt?number=1006 retrieved on Aug. 9, 2006.

Salemi, Joe, *PC Magazine Guide to Client/Server Databases,* Ziff–Davis, Emeryville, CA, 1993, pp. 1–53, 176–186.

*TCP/IP Illustrated, vol. 1: The Protocols,* Addison–Wesley Publishing Co., by Stevens, W. Richard. (1993) Reading, MA, pp. vii–47.

*Teletel Newsletter, Special Issue No. 2, French Telecom,* (Sep. 1987 ).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 8, 11–13, 16–19, 22 and 23 is confirmed.

Claims 1–7, 14 and 21 are cancelled.

Claims 9, 10, 15 and 20 were not reexamined.

* * * * *